United States Patent [19]

Ingram

[11] 4,210,966
[45] Jul. 1, 1980

[54] SELECTIVELY COMBINING SEGMENTS OF AT LEAST FOUR ACOUSTIC WELL LOGGING WAVEFORMS TO AUTOMATICALLY MEASURE AN ACOUSTIC WAVE PARAMETER

[75] Inventor: John D. Ingram, Meudon, France

[73] Assignee: Schlumberger Technology Corp., New York, N.Y.

[21] Appl. No.: 928,389

[22] Filed: Jul. 27, 1978

Related U.S. Application Data

[63] Continuation of Ser. No. 581,381, May 27, 1975, abandoned.

[51] Int. Cl.² .......................... G01V 1/40; G01V 1/36
[52] U.S. Cl. .......................... 367/27; 367/31; 181/103
[58] Field of Search ............... 340/15.5 BH, 15.5 TN, 340/15.5 AC, 15.5 CC, 15.5 AP; 181/102, 103; 364/421

[56] References Cited

U.S. PATENT DOCUMENTS

| | | | |
|---|---|---|---|
| 3,281,773 | 10/1966 | Newman | 340/15.5 |
| 3,292,729 | 12/1966 | Blizard | 340/15.5 BH |
| 3,424,268 | 1/1969 | Vogel | 340/15.5 TN |
| 3,696,331 | 10/1972 | Guinzy et al. | 340/15.5 DP |

OTHER PUBLICATIONS

Scott et al., "Acoustic Logging for Mining Applications," 6/5/74, pp. 1–10, SPWLA 15th Annual Logging Symposium.

*Primary Examiner*—Nelson Moskowitz
*Attorney, Agent, or Firm*—Kenneth Olsen; Henry N. Garrana; Louis H. Reens

[57] ABSTRACT

At least four waveforms representative of sonic waves obtained from an acoustic investigation of a borehole with at least four sonic receivers are combined to automatically measure a parameter of a wave present in the waveforms. The waveforms are derived from sonic receivers which are selectively spaced from each other as well as the sonic transmitter whose sonic pulses caused the sonic waves. Several techniques are described to measure acoustic wave parameters such as the interval travel time of compressional and shear waves for open or cased boreholes. In accordance with one technique a multiple fold correlation process and apparatus are described to measure the acoustic wave parameter.

19 Claims, 35 Drawing Figures

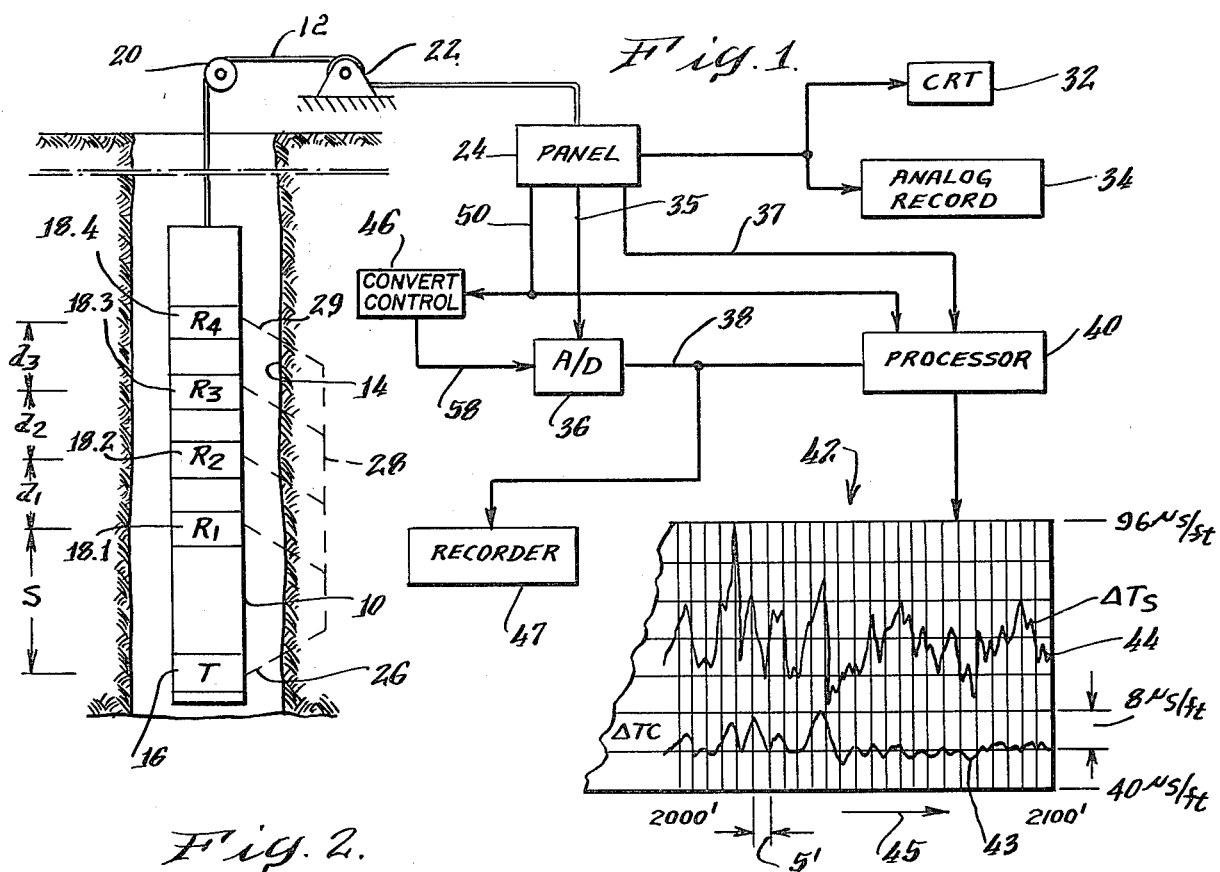
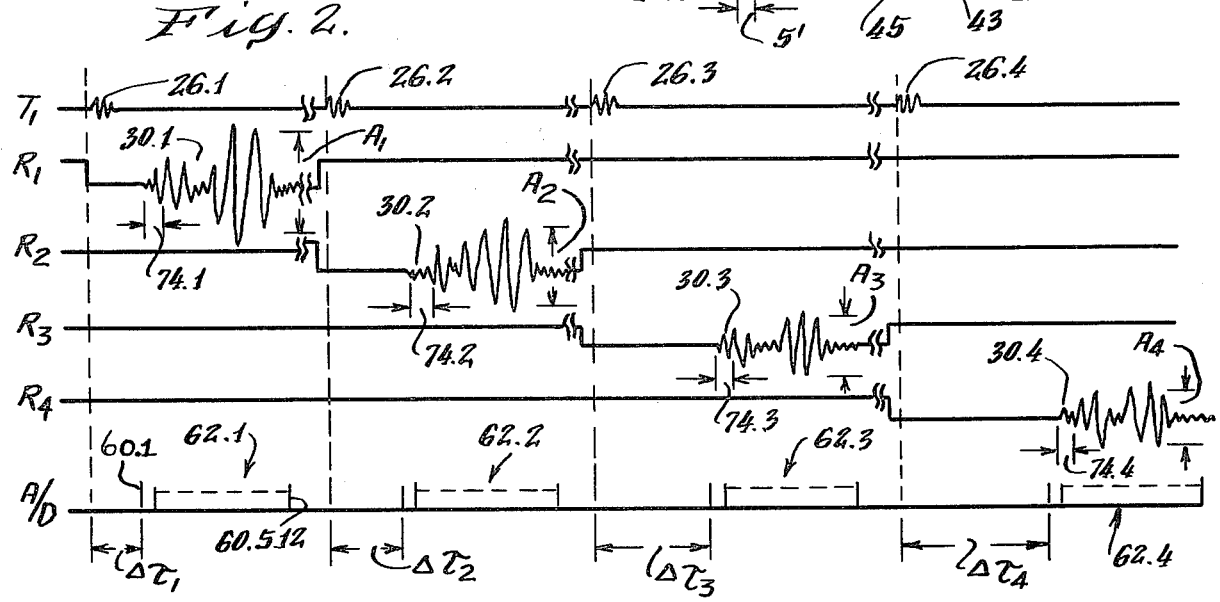
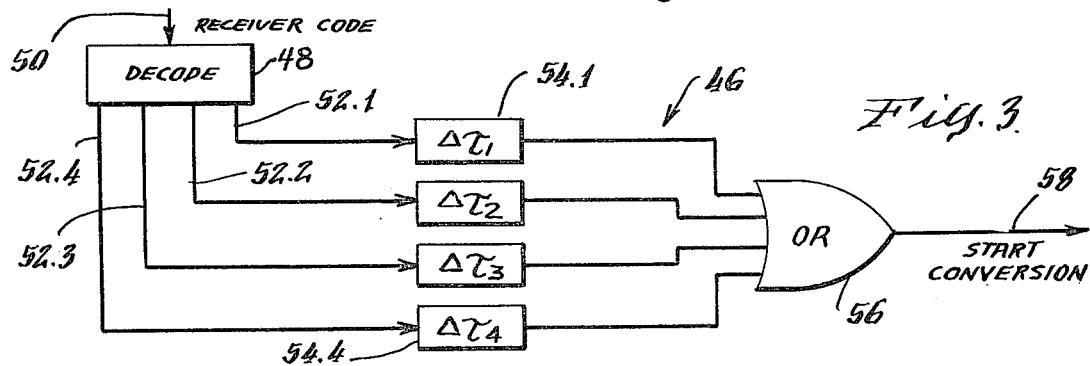

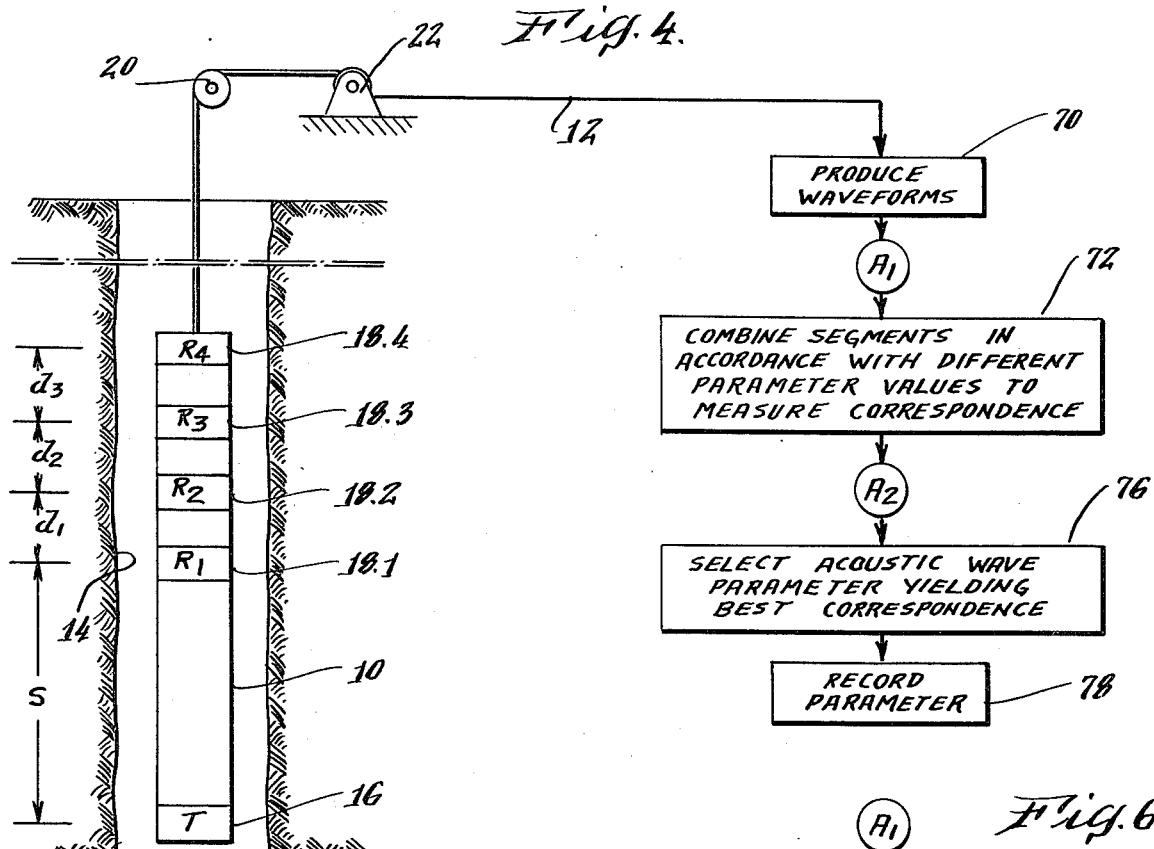
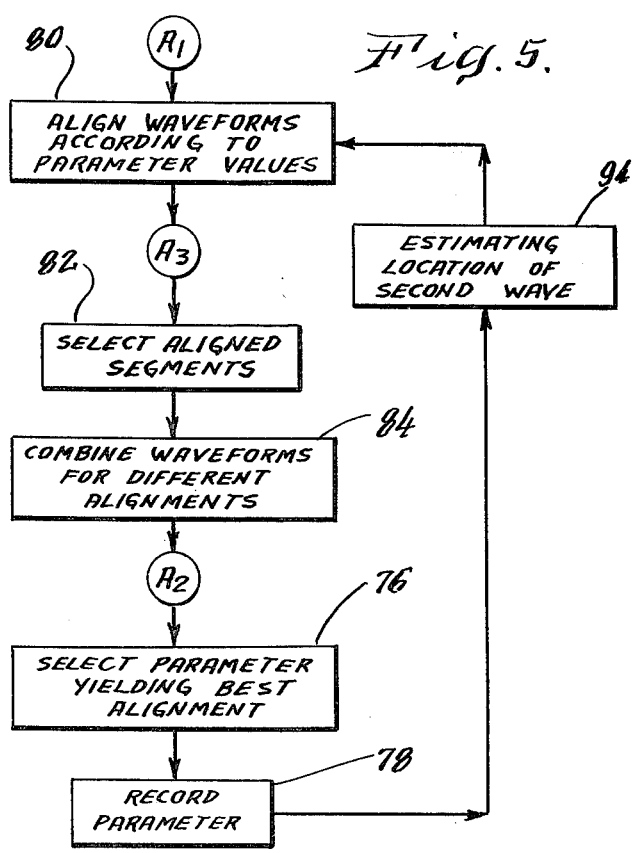
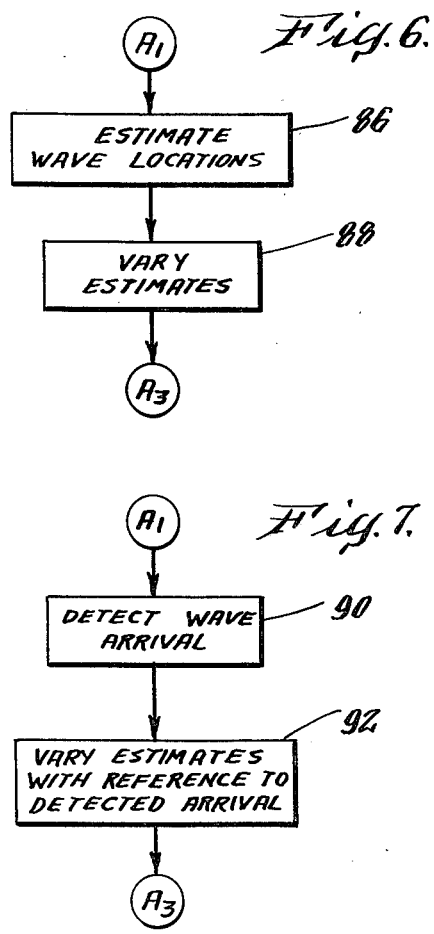

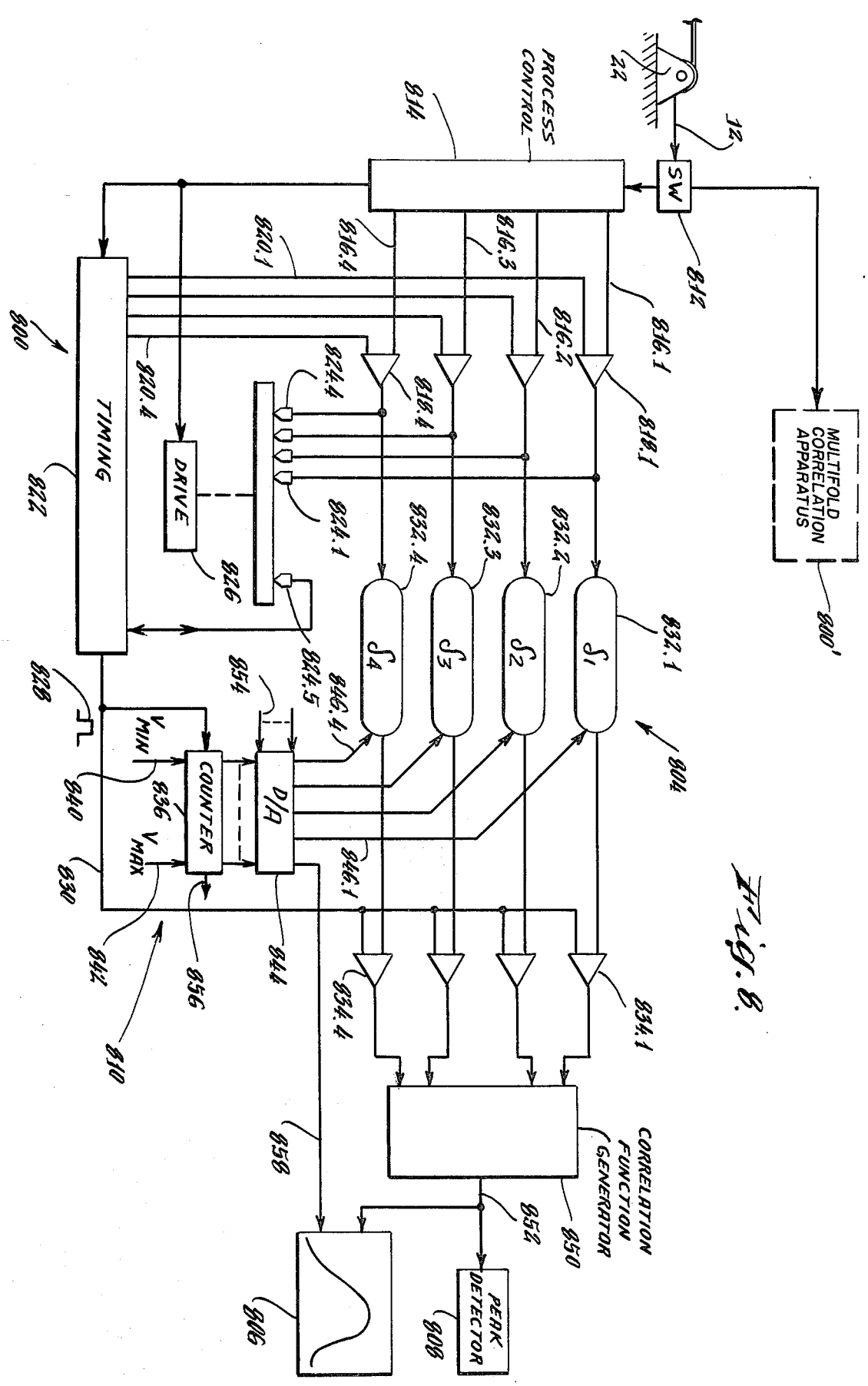

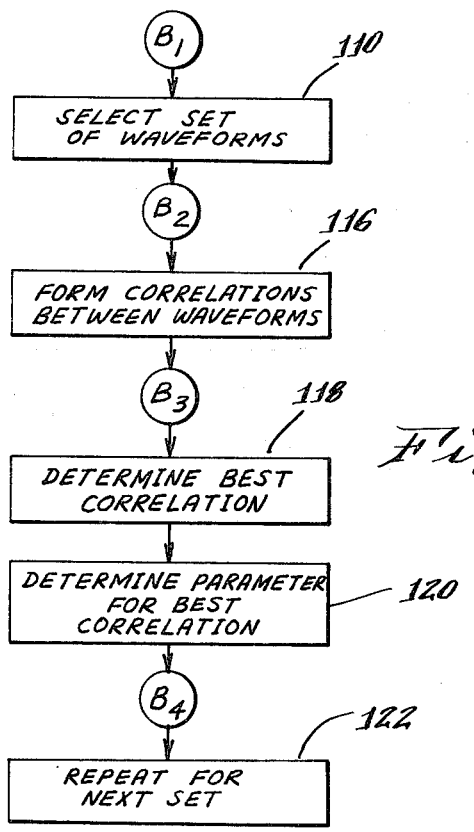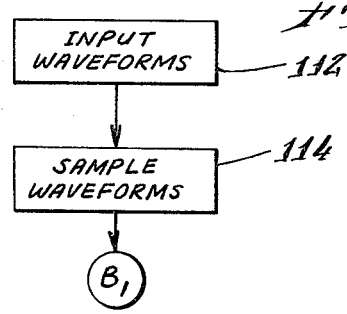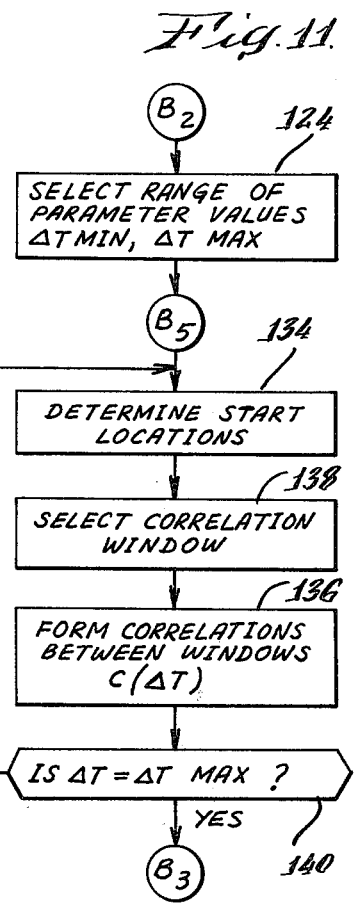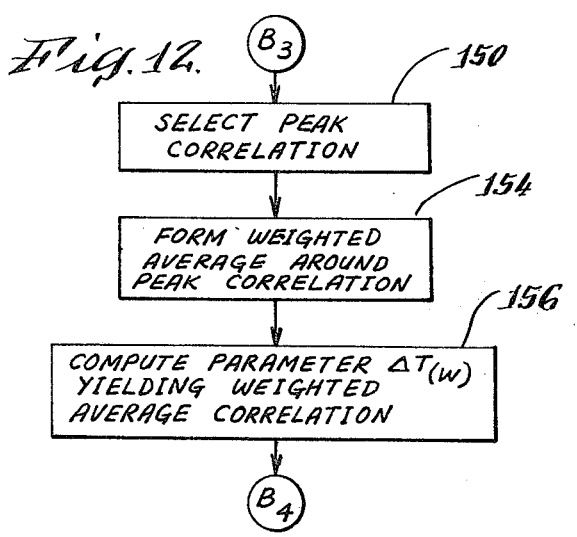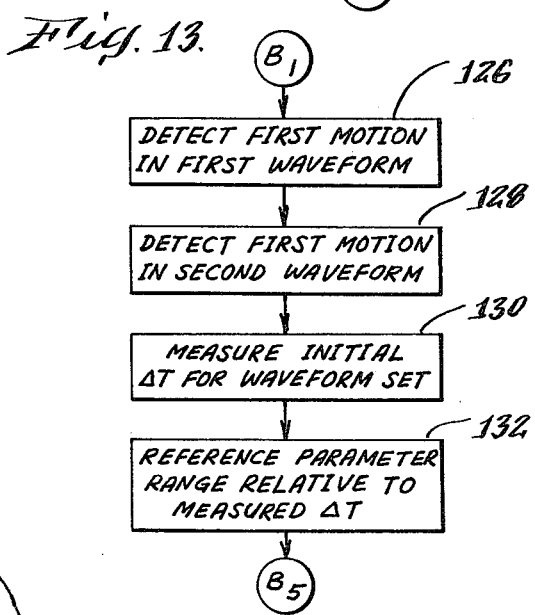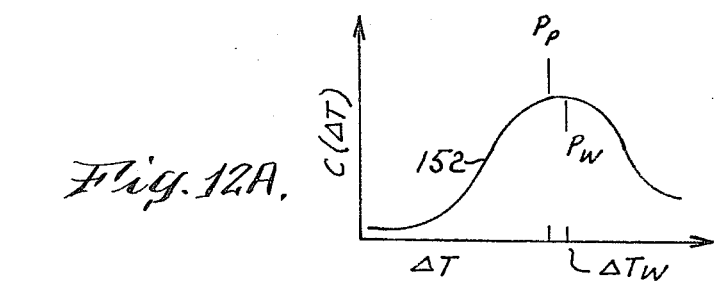

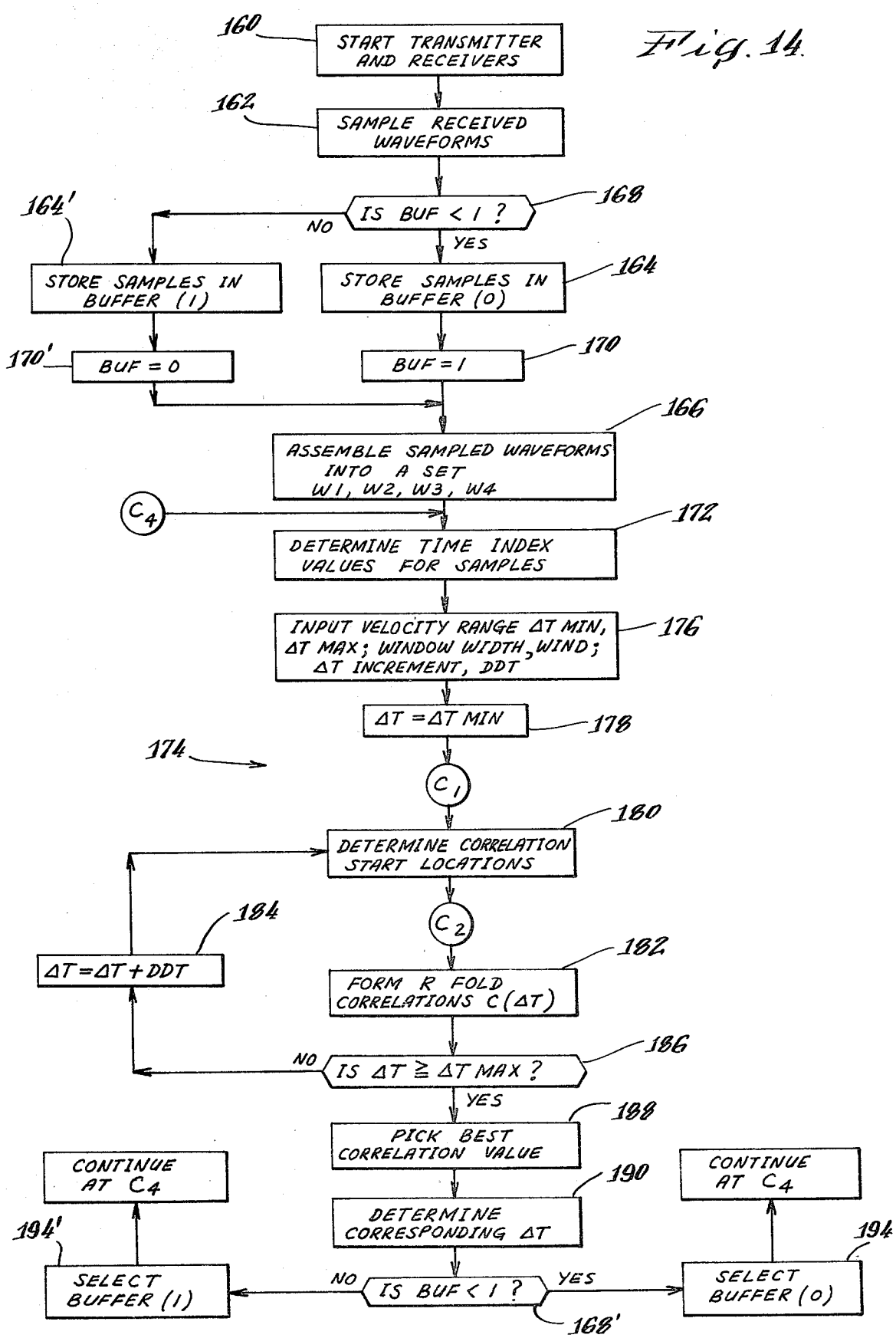

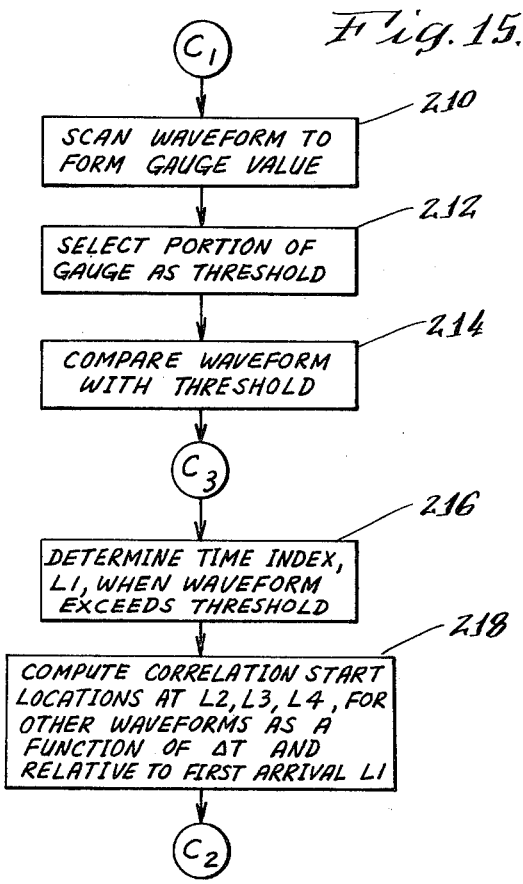
Fig. 15.
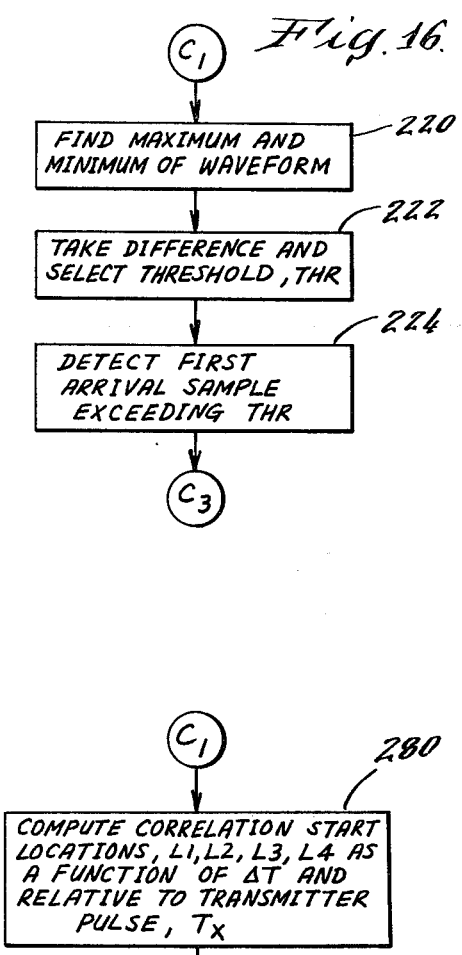
Fig. 16.
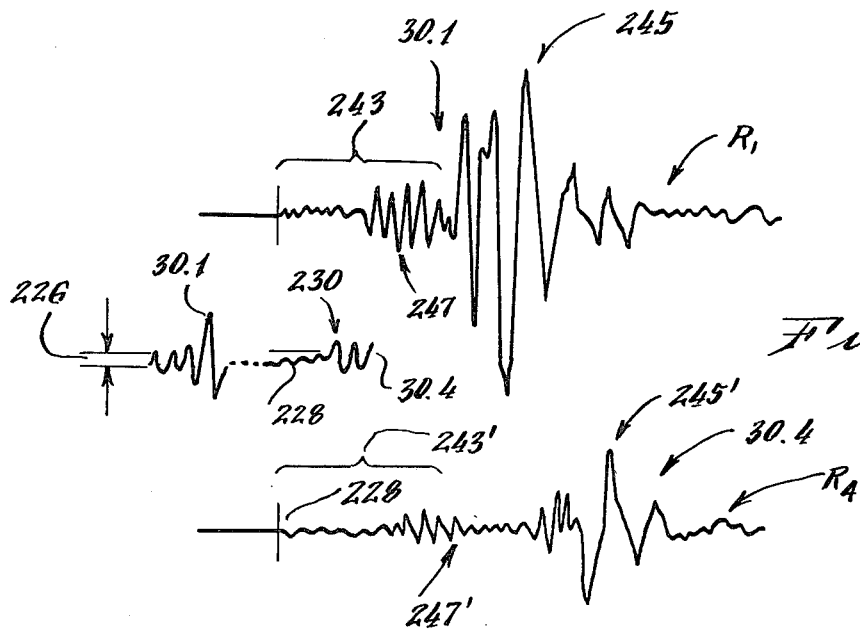
Fig. 17.
Fig. 18.

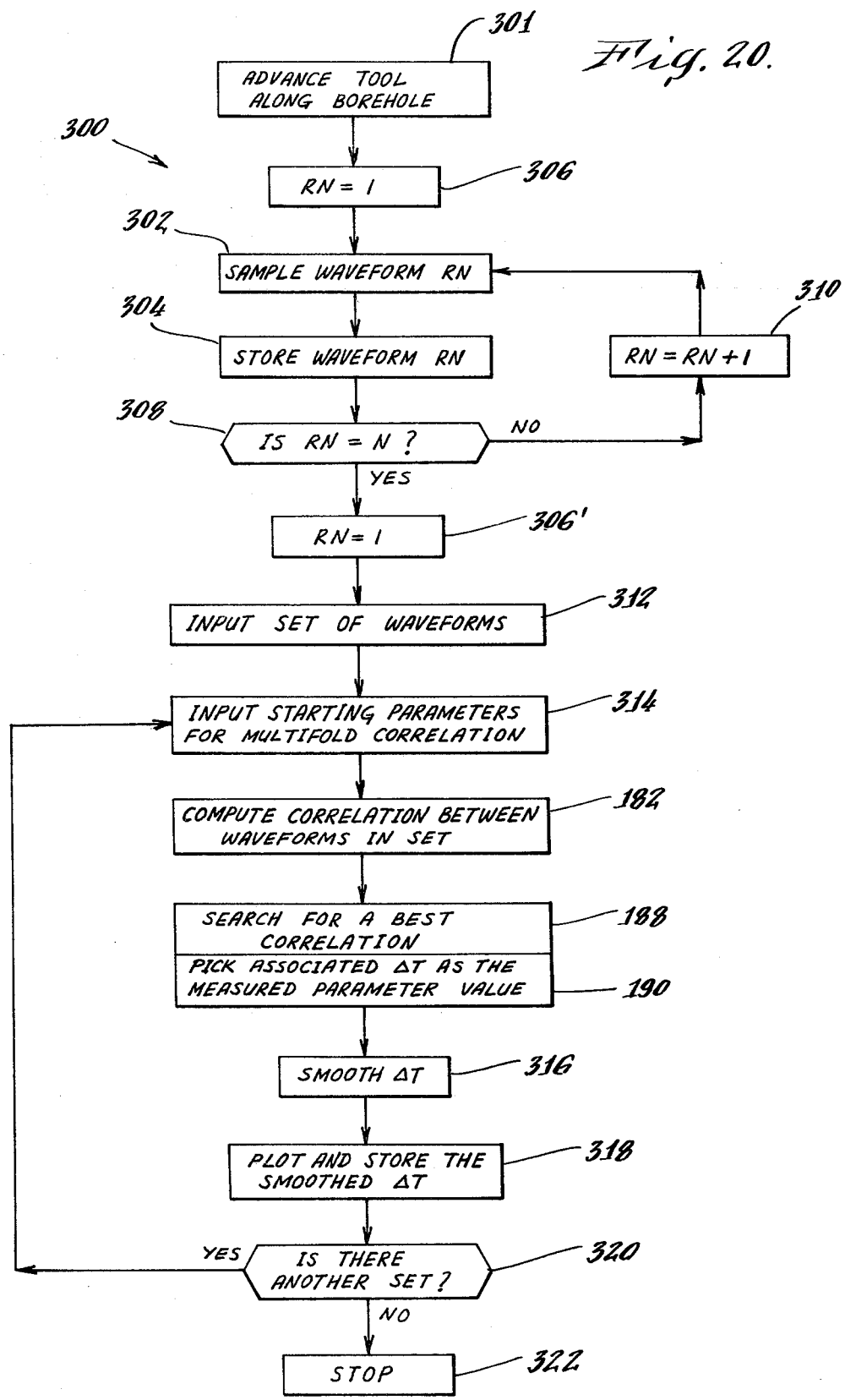

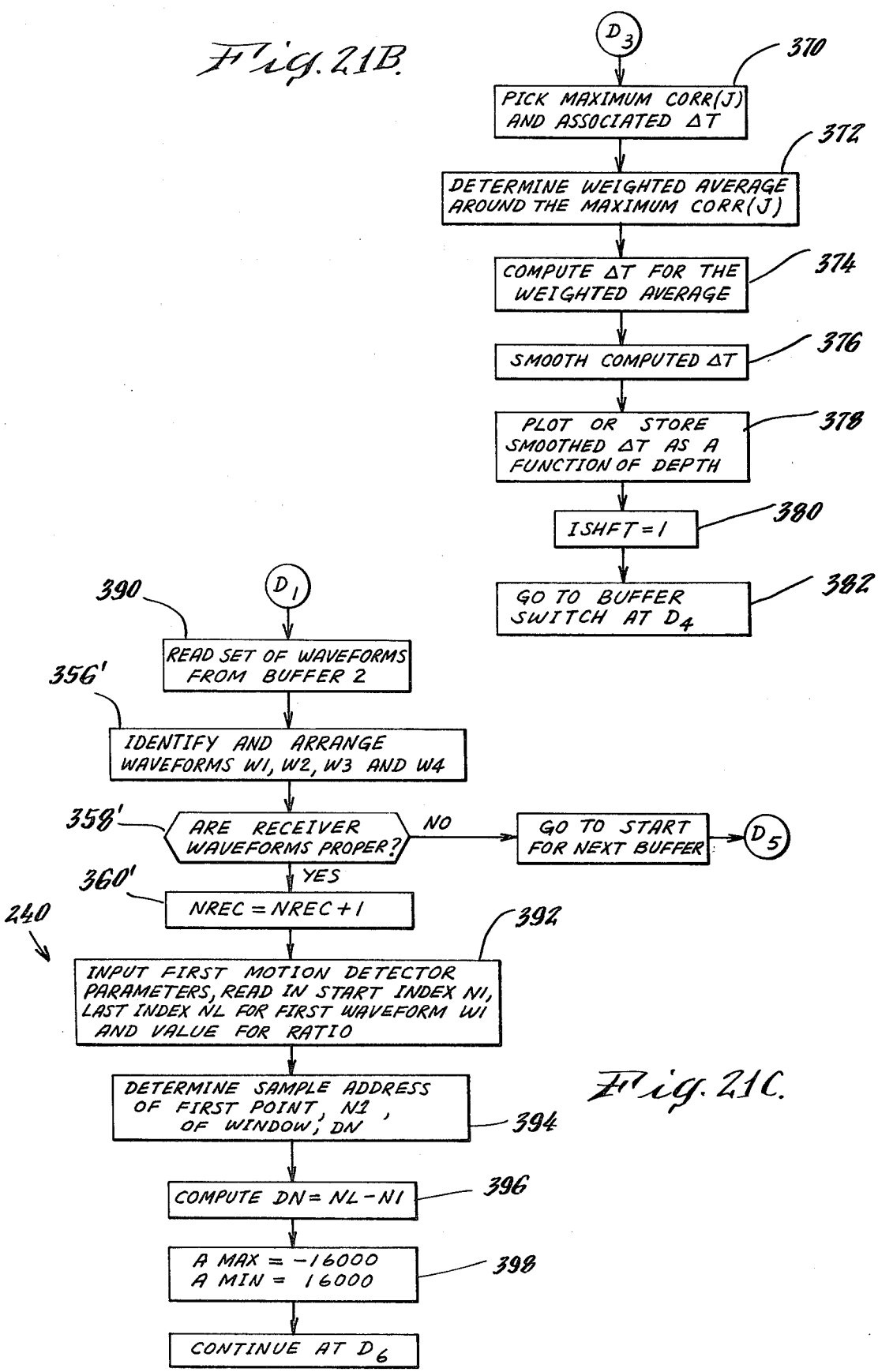

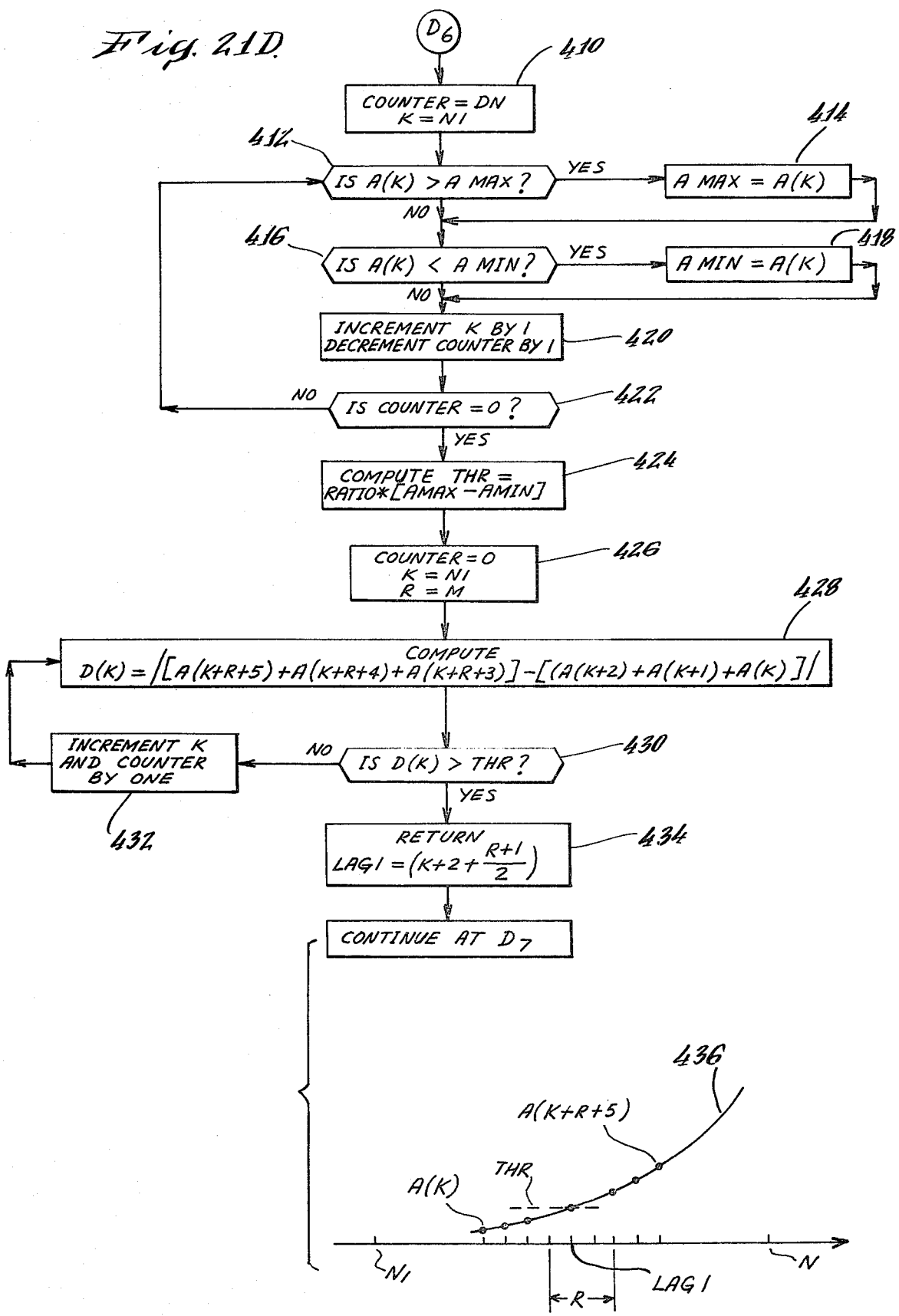

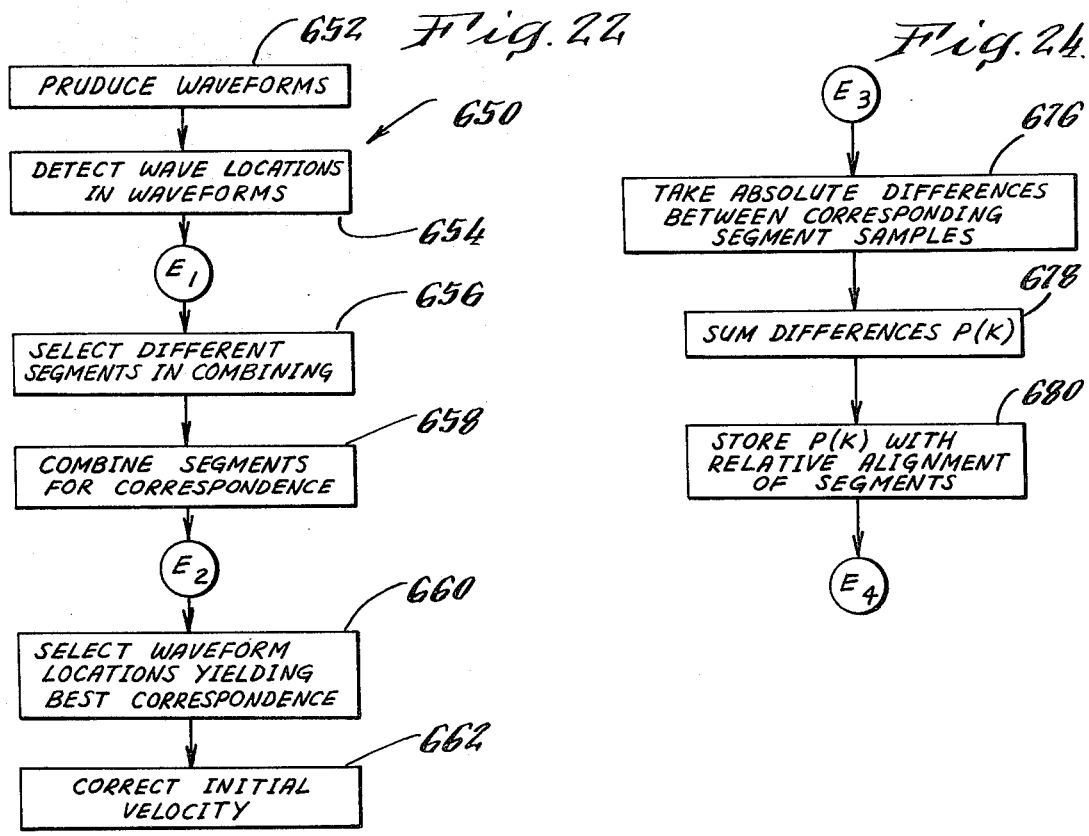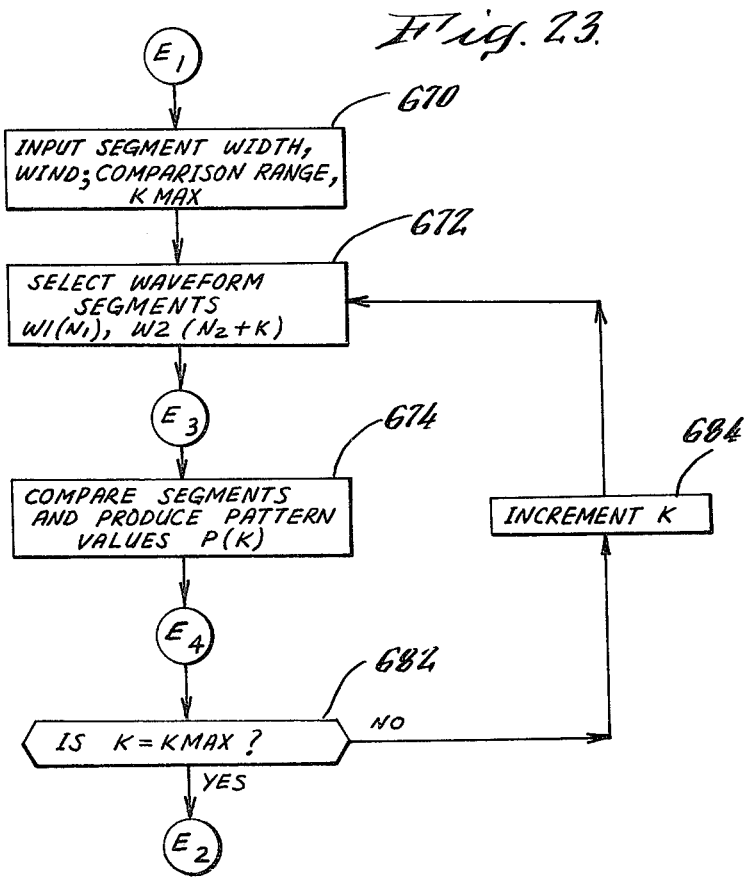

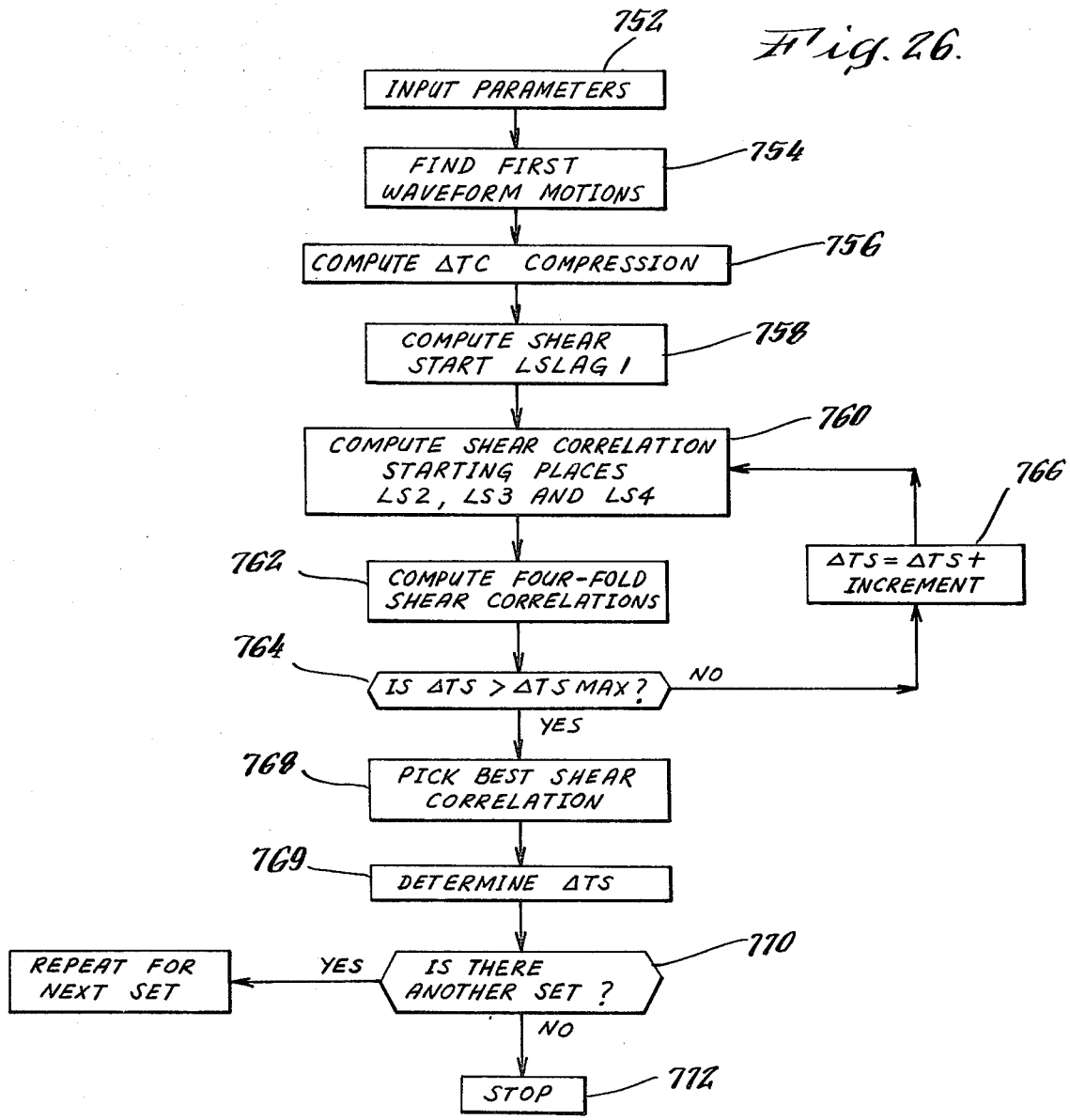

SELECTIVELY COMBINING SEGMENTS OF AT LEAST FOUR ACOUSTIC WELL LOGGING WAVEFORMS TO AUTOMATICALLY MEASURE AN ACOUSTIC WAVE PARAMETER

This is a continuation of application Ser. No. 581,381, filed May 27, 1975, now abandoned.

FIELD OF THE INVENTION

This invention relates to a method and apparatus for well logging. More specifically, this invention relates to a method and apparatus for determining parameters of acoustic waves to investigate an acoustic medium within the sphere of influence of an acoustic borehole logging tool.

BACKGROUND OF THE INVENTION

Acoustic well logging techniques and tools are extensively described in the art. Acoustic well logging is used to provide surveys of formations traversed by earth boreholes. In particular, measurements are made of the velocities of acoustic waves to reveal valuable information concerning the type of rocks and the porosity of the rocks in the formation surrounding the borehole. A commonly measured acoustic parameter is the velocity of compressional waves. However, other acoustic wave parameters such as the velocity of shear waves and other modes of acoustic energy are also useful in evaluating the formation.

An acoustic well logging tool for measuring the velocity of acoustic waves typically employs a sonic pulse transmitter and a plurality of sonic receivers selectively spaced from the transmitter. The sonic receivers include transducers to convert the incident acoustic wave to an electrical waveform and suitable amplifiers to transmit the waveforms to surface located processing equipment.

The spacings between the sonic receivers and the transmitter influence the character of the parameter measurement. For example, a longer spacing enables a greater effect of the formation characteristics on the sonic wave with the possibility that wave analysis can thus reveal more useful data about the formation. On the other hand, a longer spacing results in the arrival of greatly attenuated sonic waves making their analysis more difficult. When many spaced sonic receivers are employed to measure the velocity of the acoustic wave, the need to maintain adequate spacings between each of these receivers results in strongly attenuated waves.

Current sonic well logging tools commonly use one transmitter with a pair of sonic receivers. A double pair of transmitter-receivers has been used in the art, for example to provide compensation for physical misalignments of the tool in the borehole as described in the U.S. Pat. No. 3,304,537 to Schwartz. A three receiver, single transmitter sonic well logging tool has been described in U.S. Pat. No. 3,390,377 to Elliott et al. Generally, when the number of receivers is increased to improve the velocity measurement, special techniques are needed to process the increase in the flow of signals and enhance the accuracy of sonic wave parameter measurements.

The use of computers in determining any of several correlation functions between two signals is a well established field. Much literature has been written on the subject and general reference may be made, for example, to a book entitled "Statistical Communication and Detection" written by E. A. Robinson and published by the Hafner Publishing Company of New York in 1967. Of particular interest in this book is the section dealing with numerical filtering methods for digital computers. Various correlation techniques are described.

SUMMARY OF THE INVENTION

In a method and apparatus for automatically determining an acoustic wave parameter of a sonic wave in accordance with the invention, waveforms representative of sonic waves are generated and detected in a well logging operation. Segments of the waveforms are produced and aligned in successively different positions, which are determined in correspondence with different assumed values of the acoustic wave parameter. The various waveform segments for each of the alignments are combined to form measurements of the correspondence of the waveform segments as a function of a range of values for the acoustic wave parameter. The acoustic wave parameter value which yields the best correspondence is then selected as the determined value of the acoustic wave parameter.

Method and apparatus for determining an acoustic wave parameter, such as the transit times of compressional or shear waves may be accurately employed. The acoustic wave parameter may be displayed as a function of depth of investigation or as a singular measurement of a borehole region of interest. The improved accuracy of the acoustic wave parameter measurement is particularly useful in the analysis of the formation surrounding the borehole. Further, the technique provides measurements for later arriving waves where earlier arriving waves of greater amplitude prevent conventional bias detection of the later arriving waves.

The automatic determination of an acoustic wave parameter in accordance with the invention uses waveforms which are representative of sonic waves incident upon a plurality of at least four sonic receivers employed during a borehole investigation. The waveforms may be produced directly from the sonic receivers or from a record on which the waveforms were stored.

The acoustic wave parameter may be advantageously determined with a method and apparatus of this invention by using sampled waveforms. A signal processor is used to select and combine sampled segments of the waveforms to obtain various measurements of correspondence between differently aligned segments for a determination of the acoustic wave parameter. Techniques are employed to process the sampled waveforms in a rapid manner whereby the acoustic wave parameter can be automatically determined generally about the same time the sonic waves are detected by the sonic receivers.

As described in one technique for determining an acoustic wave parameter for a well logging operation in accordance with the invention a set of waveforms from different receivers is assembled. Variously aligned segments of the waveforms in the set are combined with a multiple fold correlation technique applied to generate correlation values as a function of a range of acoustic wave parameter values. The acoustic wave parameter value which yields the best correlation, such as a peak value, or a weighted peak value, is then selected as the acoustic wave parameter for the set of waveforms.

In a preferred form for the technique of determining the acoustic wave parameter, a set of sampled waveforms is used. The samples are arranged in groups with each group being derived from a different sonic receiver. The time between samples is small, of the order of microseconds, while determination of the acoustic wave parameter can be resolved on a time scale which is less than the time interval between samples. Each sample has an index value which represents a known time interval from the occurrence of the sonic pulse which caused the waveform. In this manner the index value of the particular samples of interest in the various waveforms can be used to determine acoustic wave parameters such as the transit times or velocities of the compressional and shear waves.

Another technique for determining an acoustic wave parameter in a well logging operation in accordance with the invention involves an accurate detection of the first motion in the waveforms. A gauge value of the magnitude of a waveform is determined and used to derive a threshold level. A comparison technique is applied to the waveform to detect the time when the waveform first exceeds the threshold. The threshold automatically varies with the amplitude of the waveform, to enable an accurate determination of the first motion.

The technique for detecting the first motion is advantageously applied to sampled stored waveforms. The waveform can be quickly scanned to measure its magnitude. A threshold which may be, for example, a predetermined fraction of the magnitude, is then established to detect the first motion. With such technique for detecting a first motion, an automatic compensation for waveform amplitude variation is obtained.

The first motion detection technique is advantageously applied to determine an acoustic wave parameter such as the transit time of a compressional wave by comparing the first motion detection of waveforms derived from different receivers.

The first motion detection technique may be further advantageously employed to control the start of a multiple fold correlation process to determine the acoustic wave parameter of a sonic wave present in a set of waveforms. The first motion detection determines the location of a first segment for a first waveform. This segment is then correlated with other waveform segments whose positions are varied as a function of a range of values of the acoustic wave parameter. In effect, the time to execute the correlation technique may be advantageously reduced by precisely determining a starting place with the first motion detection.

A multiple fold correlation involves the combination of segments of at least three different waveforms in a manner which will reveal those waveform regions which have the best similarity. For example, in accordance with one described multiple fold correlation technique, segments of each waveform in a set of at least three receiver waveforms are multiplied. The multiplications are summed for different waveform segments selected as a function of a value for the acoustic wave parameter. A number of such sums is generated for a corresponding number of different acoustic wave parameter values. The sum, such as the largest, which represents the best similarity or best correlation between the three waveforms, such as the largest sum, is determined. The value of the acoustic wave parameter which yielded the best similarity is then selected as the parameter value for the set of waveforms.

When a multiple fold correlation technique is used for a determination of, for example, the velocity of the compressional wave, the latter's potential range of values may be used as a variable. A typical range for compressional wave transit time is between about 40 microseconds per foot in hard-non-fractured rock to about 220 microseconds per foot for soft formations. The multiple fold correlation technique is thus conveniently carried out in one mode by aligning a correlation window of a limited number of samples along the sampled waveforms as a function of the possible values for the compressional wave. If the first motion for the compressional wave has been located for the waveform from the nearest receiver, one correlation window remains effectively anchored at the first motion while other windows are aligned or effectively moved along the other waveforms.

The range of values for determining the compressional wave velocity with a multiple fold correlation technique can be advantageously reduced by employing an accurate detection of the first motion in waveforms from a pair of spaced receivers. The detected first motions provide an initial coarse determination for the velocity whose precise value can be determined with a reduced multiple fold correlation technique. The reduction is achieved by limiting the range of the correlation variable, the velocity of the compressional wave, around the initial coarse determination. With this technique a substantial time reduction is obtained for completing the multiple fold correlation technique.

In an alternate technique for determining an acoustic wave parameter using multiple fold correlation, correlation windows are swept for alignment through each of the waveforms in a set as a function of estimated wave arrivals for different assumed values of the velocity of the wave of interest without detection of a first motion.

In another technique for determining an acoustic wave parameter sampled waveforms are used in a pattern comparison to determine an index value of the sample where the best similarity between the waveforms occurs.

The pattern comparison technique includes the detection of the first motion of the compressional wave in each waveform. Thereupon a comparison window is formed of a predetermined number of samples and a pattern comparison is made between the window samples in the respective waveforms in the vicinity of the first motions.

The comparison windows are relatively aligned for different samples over a preselected range to precisely detect the sample index value yielding the best pattern similarity. The difference between the first motion detections is then corrected for the amount of alignment needed to obtain the best similarity of the patterns to determine the velocity of the compressional wave.

The pattern comparison well logging technique for determining an acoustic wave parameter may be rapidly completed for each set of waveforms to facilitate real time processing of the waveforms with relatively slow but economical processors.

In a technique for determining an acoustic wave parameter such as the velocity of the shear wave another parameter such as the compressional velocity is first determined, the value of the compressional velocity is then employed to select starting places to determine the shear velocity. With this technique parameters of waves deeper within the waveform such as the shear velocity can be determined substantially free from interference by other waves.

In another technique for determining an acoustic wave parameter, waveforms are initially processed to effectively remove an undesired sonic wave of a predetermined velocity. As described with reference to one embodiment, a casing wave normally traveling in the casing of a cased borehole is removed to allow the determination of wave parameters such as the compressional and shear velocities of the waves traveling in the formation.

The wave traveling in the casing may be effectively filtered out of the waveforms by initially deriving a waveform wherein the casing signal has been emphasized. Weighted values of the emphasized casing waveform are then used to remove or filter this waveform from the detected waveforms.

The filtered waveforms may then be displayed or further processed to obtain acoustic wave parameters such as the velocities of the compressional or shear formation waves.

It is, therefore, an object of the invention to provide a technique for accurately determining acoustic wave parameters of waves present in waveforms representative of sonic waves detected during sonic well logging.

It is a further object of the invention to provide a technique for accurately determining the velocity of acoustic waves detected with a sonic well logging tool.

The novel features of the present invention are set forth with particularity in the appended claims. The operation, together with further objects and advantages of the invention, may be best understood by way of illustration and examples of certain embodiments when taken in conjunction with the accompanying drawings.

BRIEF DESCRIPTION OF DRAWINGS

FIG. 1 is a schematic block diagram of a system employed to obtain acoustic wave parameter determinations in accordance with the invention;

FIG. 2 is a timing diagram of the operation of several components of the system depicted in FIG. 1;

FIG. 3 is a schematic representation of a control circuit used to initiate an A/D converter;

FIG. 4 is a flow chart of process steps used in one method for determining an acoustic wave parameter in accordance with the invention;

FIG. 5 is a flow chart of additional process steps for use with the method shown in FIG. 4;

FIGS. 6 and 7 are flow charts respectively showing more detailed process steps for use with the method shown in FIG. 5;

FIG. 8 is a block diagram of an apparatus for determining an acoustic wave parameter in accordance with the invention;

FIG. 9 is a flow chart for another process to determine an acoustic wave parameter in accordance with the invention;

FIG. 10 is a flow chart of additional preliminary process steps for use with the method of determining an acoustic wave parameter shown in FIG. 9;

FIGS. 11, 12 and 13 are flow charts showing more detailed process steps for use with the method shown in FIG. 9;

FIG. 12A is a plot of correlation values as a function of a correlation variable such as the transit time of compressional wave;

FIG. 14 is a flow chart of a process to determine the velocity of an acoustic wave in accordance with the invention;

FIGS. 15, 16 and 17 are flow charts of more detailed process steps for use with the method shown in FIG. 14;

FIG. 18 is a representation of waveforms processed with the method of FIG. 14;

FIG. 20 is a flow chart for another process to determine an acoustic wave parameter in accordance with the invention during a sonic borehole investigation;

FIGS. 21A through 21H are flow charts of detailed process steps for one method to determine the velocity of compressional waves in accordance with the invention from sampled waveforms representative of sonic waves detected during sonic well logging;

FIG. 22 is a flow chart of steps for a pattern detection method to determine an acoustic wave parameter in accordance with the invention;

FIG. 23 is a flow chart of more detailed steps for use with the method steps shown in FIG. 22;

FIG. 24 is a flow chart of steps for use with the method shown in FIG. 23;

FIG. 26 is a flow chart of one method in accordance with the invention to determine the velocity of shear waves present in waveforms obtained during sonic well logging;

DETAILED DESCRIPTION OF EMBODIMENT

FIGS. 1, 2, 3

Figure 19:
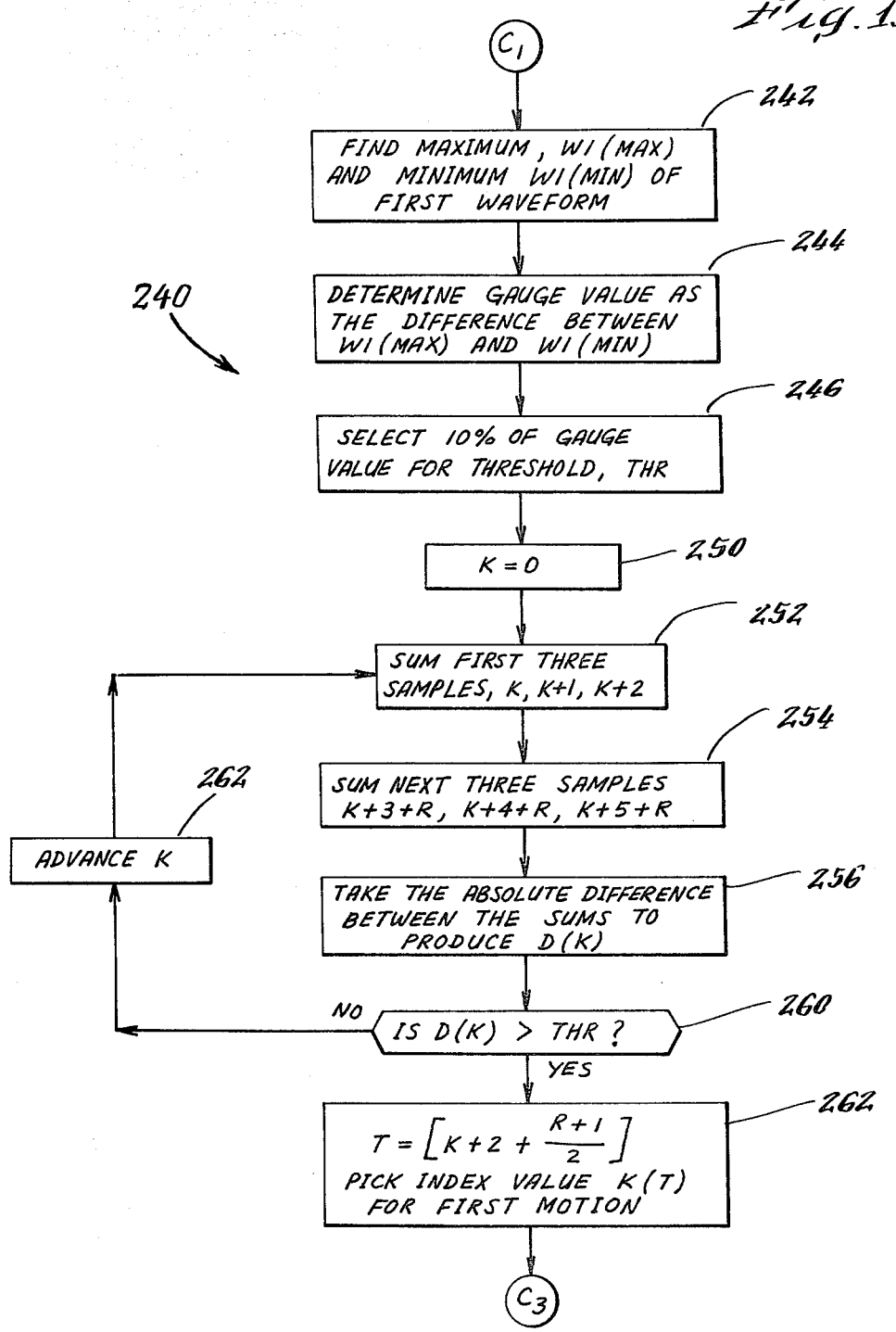
FIG. 19 is a flow chart of more detailed process steps for use with the method shown in FIG. 15.

With reference to FIG. 1 a sonic borehole logging tool 10, with centering elements deleted, is shown suspended from a cable 12 in a borehole 14. The tool 10 includes a transmitter 16 located at the bottom of the tool and at least three and preferably four selectively spaced sonic receivers 18.1, 18.2, 18,3 and 18.4. The cable 12 is shown fed over a pulley 20 from a cable supply 22 and is electrically connected to a panel 24. The panel 24 includes suitable amplifiers, switching circuits and electrical supplies for tool 10 and the firing of sonic transmitter 16. The tool 10 includes suitable amplifiers and controls needed to enable receivers 18 to sequentially detect sonic waves and provide panel 24 with waveforms representative of the acoustic waves incident upon transducers in receivers 18.

In the operation of the sonic logging tool 10, the transmitter 16 is regularly energized (about ten times per second) to produce sonic pulses such as 26 in FIG. 2 while the tool is moved upwardly at a speed of the order of a foot per second. Each pulse 26 is directed at the formation in which an acoustic wave such as 28 is launched. The acoustic wave 28 has components which travel through the formation towards the receivers 18 and in turn produce wave components 29 which are incident upon the receivers 18 to produce a set of waveforms such as 30.1, 30.2, 30.3 and 30.4 shown in FIG. 2. Waveforms 30 may also include those sonic waves which, after travel through the borehole, are incident upon receivers 18.

Although the transmitter is regularly activated, the receivers 18 preferably are alternately enabled to generate waveforms in the sequence as shown by waveforms 30.1–30.4. In this manner, waveforms which are of several milliseconds duration can be analyzed to detect acoustic wave parameters in various waveform segments such as those reflecting the presence of compressional or shear waves. In addition, the sequential enabling of receivers 18 allows their outputs to be multiplexed onto a common line towards panel 24. This is an advantage when the analog form of the outputs of receivers 18 is to be conducted to panel 24 since the analog waveforms 30 are all exposed to the same electronic amplification and cable attenuation to enable amplitude comparisons. The advance of the tool 10 during the time needed to generate one complete set of waveforms 30 can be controlled and is not sufficient to appreciably affect velocity measurements.

The receivers 18 each bear a known spacing "d" from each other while the distance "S" between receiver 18.1 and transmitter 16 is known to further accurately locate all the receivers from transmitter 16. When, for example, the arrival of the compressional wave is precisely detected at each receiver, then the time between respective receiver arrivals provides an accurate determination of the velocity of the compressional wave. By employing a multiple number of receivers 18 such as four with tool 10, a more accurate and reliable determination of wave velocities can be made.

When a large number of receivers 18 are used, the maximum peak-to-peak amplitude, A, for the waveforms 30 decreases with the distance between the receivers 18 and transmitter 16. The attenuation of the acoustic waves 28 can become so great that the resulting waveforms from the more remote receivers are difficult to use with conventional wave velocity determining techniques available in the field. Such attenuation renders velocity determinations particularly difficult when three receiver spacings "d" of the order of one foot and a transmitter to receiver spacing "S" of about eight feet is employed. An increase in the acoustic energy of pulses 26 cannot readily be used to compensate for the attenuation.

The waveforms 30 may arrive at the panel 24 either in analog form or in sampled form. For example, the tool 10 may be provided with an analog to digital (A/D) converter to sample waveforms 30. The samples are then transmitted along cable 12 to panel 24 for further processing.

In the practice of methods of this invention for automatically determining acoustic wave parameters of sonic waves generated during well logging, waveforms 40 are produced representative of sonic waves from receivers such as 18. The waveforms may be produced in analog form such as from an analog record 34, or directly from receivers 18. Alternatively, the waveforms may be produced in sampled or digitized form from a previous sample recording or from an A/D converter 36 located either near panel 24 as shown in FIG. 1 or downhole with tool 10.

In the system depicted in FIG. 1, the waveforms 30 arrive in analog form at panel 24 where they may be coupled to a cathode ray tube 32 for real-time display and to a magnetic tape recorder 34 to provide an analog record.

The waveforms 30 may be processed in sampled form as shown with the apparatus depicted in FIG. 1 or in analog form such as with the apparatus shown in FIG. 8. In order to utilize a sampled form of waveforms 30 they are shown coupled along a line 35 to an analog to digital converter 36 which generates samples of the waveforms at a high sampling rate on an output line 38.

Although not specifically illustrated in FIG. 1, panel 24 also provides depth signals from a depth sensor operatively coupled to the cable 12. The depth signals preferably are presented on line 37 in a format which is compatible with the format employed for the samples on line 38. The generation of depth signals is well known in the art of well logging and need not be further described. The output from waveform sampler 36 is applied to an apparatus 40 which processes the samples to produce acoustic wave parameter values of a sonic wave present in waveforms 30. The apparatus 40 preferably is a fast digital processor having inputs which can be accessed with digital samples produced with A/D converter 36.

The end product from apparatus 40 may be a plot 42 of, for example, the velocity of the compressional wave, $\Delta T$, in microseconds per foot as a function of well depth. Such plot 42 may be obtained with a plotter capable of responding either with sampled or analog outputs from processor 40.

Plot 42 is shown formed of the variation of the transit times, in microseconds per foot of two sonic waves, as a function of well depth in feet. Curve 43 shows the velocity of the compressional wave $\Delta TC$ and curve 44 shows the velocity of the shear wave $\Delta TS$. The plot 42 is made by moving suitable logging paper in the direction indicated by arrow 45 while the tool is raised as reflected by the indicated depth values.

The analog to digital converter 36 preferably is selected of the type capable of producing samples of waveforms 30 at a very high rate of the order of 4 microseconds per sample. With such high speed waveform conversions improved resolution of sonic wave parameter determinations can be made. In some instances lower sampling rates may be employed.

During the firing of transmitter 16 and sequential enabling of receivers 18, electronics in tool 10 provides waveform identification signals which may be coded pulses such as a two bit code word. Such receiver waveform identification code, together with a pulse to identify the firing time of the transmitter 16 are delivered along cable 12 to panel 24. A magnetic recorder 47 is provided to record the waveform samples produced by A/D converter 36 as well as the waveform identification code transmitted along cable 12.

Panel 24 is provided with a conversion control network 46 with which the actuation by the A/D converter 36 may be selectively delayed depending upon which receiver waveform is to be sampled. For example, if receiver waveforms 30 are each sampled by starting the same amount of time after the firing of transmitter 16 or upon occurrence of its output pulse 26, the amount of useful waveform samples will vary as a result of receiver spacings "d". In order to preserve the end segments of the waveforms for subsequent analysis, conversion control network 46 is used.

As shown with greater detail in FIG. 3, network 46 includes a decode circuit 48 responsive to receiver or waveform identification signals on output line 50. The decode circuit 48 generates individual pulses on lines 52 representative of the particular activated sonic receiver 18. Each receiver identification pulse initiates a delay circuit 54 to inhibit actuation of the A/D converter 36 until such time when the earliest acoustic wave could arrive. Thus, as shown with waveforms 30.1 and 30.2 in FIG. 2, the A/D conversion for each receiver waveform is delayed a known time, $\Delta \tau$, which is a function of the distance between receiver 18 and transmitter 16 and the fastest expected velocity of the acoustic wave.

The delay $\Delta \tau_1$ for the first sonic receiver is selected equal to $(v \times S) - K$ where v is the fastest compressional wave velocity in microseconds per foot, S the distance between receiver 18.1 and transmitter 16 and the value of K is selected sufficient to commence the conversion process at least a small known instant before wave arrival. The delays of the conversion of electrical waveforms from the other receivers 18 are determined in a similar manner. Hence, for a spacing of S equal to eight feet, the spacings "d" of one foot each, and with a value of K equal to 12 microseconds, the respective delays from the time of firing of any transmitter pulse 26 are $\Delta\tau_1 = 308$ μseconds, $\Delta\tau_2 = 348$ μseconds, $\Delta\tau_3 = 388$ μseconds and $\Delta\tau_4 = 428$ μseconds.

These delays may be obtained using logic or analog delay circuits. The delays, once set, should remain constant so that index values employed in the operation of signal processor 40 are referenced to a common time such as the transmitter pulses 26. The outputs of delay circuits 54 may be combined with an OR circuit 56 to provide the desired enabling pulse on line 58 to commence A/D conversion.

The A/D converter 36 commences conversion at the end of each delay $\Delta\tau$. The conversion process continues for a sufficient time period to provide samples of the portions of the waveforms of interest. When a sampling rate of four microseconds is employed, a total of 512 samples, or about two milliseconds, of waveform duration as sufficient in many cases to determine acoustic wave parameters for such sonic waves as the compressional and shear waves. The number of samples used in any one group may be varied with 512 being generally used herein as an illustrative example. The number of samples is likely to change with the sampling rates with a greater number of samples being used with higher sampling rates and less samples with a lower rate. Hence, A/D converter 36 is provided with a suitable counter (not shown) which terminates the conversion process when the desired number of samples 60 (see FIG. 2) have been generated. The A/D conversion of each waveform 30 results in the generation of a group identified at 62 in FIG. 2 of 512 samples 60 as shown in FIG. 2.

Since each sample 60 occurs at a known sampling rate, any one sample has an index value which can be directly related to the time interval measured from the time of occurrence of the sonic pulse 26 which caused the waveform. Thus the first sample 60.1 in group 62.1 occurs at a time equal to $\Delta\tau_1 + (N \times SR)$, where N is the index position value (N=0 for the first sample) and SR is the sampling rate in microseconds. In a similar manner, each sample 60 in the other groups 62.2, 62.3 and 62.4 can be precisely related in time to the regularly recurring sonic pulses 26.2, 26.3 and 26.4.

Thus, if the first motion in the compressional wave is detected for the sample in group 62.1 at index value N1, and in group 62.2 at index value N2, then the time $\Delta T$ for that wave to travel the distance between receivers 18.1 and 18.3 is equal to $(N2-N1)SR + (\Delta\tau_2 - \Delta\tau_1)$. With the highest wave velocity value of 40 μseconds per foot and the receiver spacing $d_1$ of one foot, and four microsecond sampling rate, the velocity of the compressional wave in microseconds per foot is $(N2-N1) \times 4 + 40$.

In some instances, the delay factors $\Delta\tau$ are so set that the A/D conversions for the receiver waveforms each begin the same interval in time after the occurrence of a sonic pulse 26. In such case the delay factors $\Delta\tau$ are all, for example, equal to zero or $\Delta\tau_1$. The measurement of a wave velocity may then be made directly by subtracting the indices for the first motions and multiplying the difference by the sampling rate.

The samples applied to processor 40 are assembled in groups of 512 samples with each group properly coded to identify a waveform from a particular receiver. The processor 40 is provided with a buffer to enable accumulation of a pair of sets of waveforms, wherein each set represents waveforms from all four receivers during a full operational cycle of the transmitter-receiver. Access to the buffer is under control by A/D converter 36 to enable transfer of the samples as they are produced.

FIGS. 4, 5, 6 and 7

With reference to FIG. 4, one method in accordance with the invention for determining an acoustic wave parameter such as the velocity of a compressional wave is shown. A tool 10 is located in a borehole 14 to originate waveforms indicative of a sonic borehole investigation. The first step 70 involves producing waveforms, which as previously described, may be obtained either directly from receivers 18 or an intermediate recording. The waveforms are preferably processed as a set wherein each waveform is from a different receiver 18.

The set of waveforms is then processed at step 72 by selectively combining segments of each waveform 30 shown in FIG. 2, in accordance with different parameter values. For example, with reference to FIG. 2, segments such as 74.1–74.4 of waveforms 30.1–30.4 respectively are chosen on the basis of an assumed range of values for the compressional wave velocity, $\Delta TC$.

If an initial value in the range is, for example, 40 μSec/foot, then the location of each segment 74 can be estimated on the basis of the transit time required for the compressional wave to traverse the distances "S" and "d". For each value of $\Delta TC$ in the range, which may extend from 40 to 220 μSec/foot, the segments 74 are combined in a manner, such as by forming a multiple fold correlation between segments 74, to obtain a measurement of correspondence between the segments. It is to be understood that those waveform segments, which represent the same sonic wave, whether it be a compressional or a shear wave, will generally correspond in shape. Such shape correspondence can be measured, particularly when waveforms from a plurality of receivers are available.

Since the selection of segments 74 is made for different values of $\Delta TC$, a corresponding number of measurements of the correspondence between waveform segments is accumulated as a function of the values of $\Delta TC$.

At step 76 in FIG. 4, the value of $\Delta TC$, yielding the best measurement of correspondence between segments is used as the determined velocity of the compressional wave for the processed set of waveforms. The value of $\Delta TC$ may be recorded at step 78 to form a plot such as curve 43 shown in FIG. 1. The process steps of FIG. 4 may be repeated for new sets of waveforms produced by, for example, regularly actuating transmitter 16 and sequentially enabling receivers 18.

In FIG. 5, the combining step 72 is shown formed of several distinct steps, starting with an alignment step 80 of the waveforms in the set being processed. The alignment step 80 contemplates a relative placement of the waveforms 30 with respect to each other so that aligned segments may be selected at step 82 for combining at step 84.

The alignment step 80 includes the storage of the waveforms 30 followed by the designation of stored waveform portions for subsequent combination at step 84. The designation is indexed for different values of the acoustic wave parameter to thus effectively provide successively different alignments of the waveforms.

Another technique for alignment step 80 can be as shown in FIG. 6 by estimating, for example, in a wave velocity determination, the approximate waveform location of the sonic wave of interest at step 88. The estimate can be based upon the length of time the wave requires to travel the distance from the transmitter 16 to the receivers 18. Since such estimate depends upon the velocity of the wave, different locations are estimated for a range of wave velocity values at step 88. Once these wave locations are estimated as a function of the transit time for the wave, combinations of selected segments 74 in the vicinity of these locations can be made to evaluate the correspondence between waveform segments.

FIG. 7 illustrates still another technique to align waveforms 30 by initially detecting the presence of a wave in a waveform as at step 90. The detection step 90 is particularly suitable for detecting the first motion of an earliest compressional arrival. The detection of the first motion at, for example, the receiver 18.1 nearest to transmitter 16, provides a convenient starting place for selection of a first waveform segment.

The location of other waveform segments are then estimated at step 92 on the basis of a potential range of transit times for the compressional wave from the nearest receiver 18.1 to the others. In effect, therefore, the technique employed in FIG. 7 for obtaining different waveform alignments contemplates affixing a waveform segment 74.1 in the vicinity of the detected first motion while the segments 74.2-74.4 are chosen from different portions of the waveforms on the basis of different values of the compressional wave velocity within a predetermined range.

It should be understood that all the alignments of the waveforms in step 80 need not be carried out before commencing the first combination of aligned segments in step 84. In fact, as will be explained with greater detail with reference to other FIGURES, the preferred technique involves combining of aligned waveforms following each realignment.

The technique for determining an acoustic wave parameter for one sonic wave as described with reference to FIGS. 4-7 is particularly useful in determining an acoustic wave parameter value for a second sonic wave. For example, when the velocity, $\Delta TC$, for the compressional wave has been determined and recorded at step 78, the value of $\Delta TC$ can be used to help ascertain the velocity $\Delta TS$ of the shear wave which follows the compressional wave.

It is well known that shear waves have a longer transit time than compressional waves, i.e. $\Delta TS$ is of the order of from 1.6 to 2.0 times as long as $\Delta TC$. See for example the article entitled "Lithology and Porosity From Acoustic Shear and Compressional Wave Transit Time Relationships" by J. F. Nations, presented at the Fifteenth Annual Logging Symposium of SPWLA, in McAllen, Texas, June 2-5, 1974 and published in The Log Analyst of November-December, 1974 at page 3.

Hence, in determining the velocity of the shear wave, the earlier determined value of $\Delta TC$ is used at step 94 in FIG. 5 to modify the waveform alignment step 80 for a shear wave alignment. For example, an initial estimate of a shear wave location in the first waveform 30.1 is made based upon the potential range of from 1.6 $\Delta TC$ to 2.0 $\Delta TC$. The waveforms are correspondingly aligned and shear segments selected at 82 in the vicinity of estimated shear wave locations to commence combining 84 for measurements of the correspondence between shear segments.

Values for $\Delta TC$ and $\Delta TS$ may thus be successively determined using the similar process steps. The shear and compressional wave velocities may be recorded to form a plot 42 as shown in FIG. 1.

FIGS. 9, 10, 11, 12 and 13

With reference to FIGS. 9-13 methods for deriving an acoustic wave parameter from sets of waveforms with a multiple fold correlation technique are described. At step 110 in FIG. 9, a set of waveforms 30 is selected. The waveforms may be in analog form as shown at 30 in FIG. 2 or sampled. The sampled waveforms may be produced as shown in FIG. 10 by inputting analog waveforms at step 112 to an A/D converter which samples the waveforms at 114. When all waveforms in a set are selected, a multiple fold correlations is made at step 116 as a function of acoustic wave parameter values within a predetermined range. The multiple fold correlation determination at 116 results in a plurality of correlation values.

These correlation values are scanned at step 118 to detect a desired value such as a peak and at step 120 the acoustic wave parameter value which produced the peak correlation is obtained. The selected acoustic wave parameter value for the waveform may be stored or plotted as shown in FIG. 1. A next set of waveforms is then processed by repeating these steps at 122.

The correlation forming step 116 of FIG. 9 is shown implemented in one form in FIG. 11 for the determination of the velocity, $\Delta T$, of the compressional wave present in the selected set of waveforms. At step 124 a range of parameter values is selected from a low value for $\Delta T$, $\Delta T$ MIN, to a high value of $\Delta T$ MAX. These range values may be selected on the basis of the type of earth formation one can encounter, i.e. from, for example, 40 to 220 $\mu Sec/foot$. Since such range includes most of the possible velocities, a substantial amount of time may be needed to determine all of the correlation values for each set of waveforms.

One method for reducing the time required to determine the correlation values for real time processing involves a narrowing of the range selected at step 124. Such range reduction may be based upon a recent history of determined values for $\Delta T$ whereby it is estimated that variations in excess of a certain factor from, for example, the last determined $\Delta T$, is unlikely to occur. The range values will thus vary as a function of previously determined $\Delta T$ values.

A preferred method for reducing the parameter range selected at step 124 in FIG. 11 is as shown in FIG. 13. The first motion in a pair of waveforms selected at step 110 in FIG. 9 is detected with steps 126, 128 of FIG. 13. Since the time of occurrence of these first motions relative to the transmitter pulse which produced the waveforms is known, an initial measurement for $\Delta T_{(INITIAL)}$ is made at step 130.

The initial value of $\Delta T$ is obtained by comparing the first arrival times detected with steps 126, 128 and allowing for the spacing between receivers 18 from which the waveforms used in steps 126, 128 were derived. When the waveforms from the nearest and farthest receivers 18.1 and 18.4 (see FIG. 4) are used in steps 126, 128, a preferred average measured value for $\Delta T_{(INITIAL)}$ is obtained.

The latter value for $\Delta T$ is used at step 132 to obtain the range of parameter values by selecting minimum and maximum range values around the measured value for ΔT. Hence, ΔT MIN is made equal to [ΔT$_{(INITIAL)}$−K], and the maximum ΔT MAX is made equal to [ΔT$_{(INITIAL)}$+K], where K represents a limit value which is sufficiently large to allow for variations in the first motion detection steps 126, 128.

Returning to FIG. 11, the selection of the parameter range is followed by a step 134 for determining start locations for a correlation forming step at 136. The start locations are determined as a function of the parameter ΔT being measured to produce correlation values as a function of ΔT.

The width for the waveform segments whose correspondence is to be measured is selected at step 138 as a correlation window. The window represents a fixed number of samples when a sampled set of waveforms are used, or a time width when an analog set of waveforms is used as with the apparatus shown in FIG. 8.

After a correlation value C(ΔT) has been obtained with step 136, a decision is made at 140 to determine whether correlation values for the entire range of parameter values have been formed. If not, the value for ΔT is incremented at step 142 and new start locations determined at 134. This is followed by a repeat of steps 136, 138 and 140 until correlation values for the entire range selected at 124 have been formed. The best or peak correlation is then selected at step 120 shown in FIG. 9 to yield a parameter value for the set of waveforms.

The determination of the parameter yielding the best correlation at step 120 in FIG. 9 is preferably implemented with steps as shown in FIG. 12. The correlation values obtained with step 136 of FIG. 11 are scanned to select a peak value P$_p$ at step 150 as shown in FIG. 12 and 12A. The parameter value yielding the peak value is noted.

FIG. 12A provides a visual representation of a plot 152 of the correlation vlues, P, as a function of the parameter value, ΔT. The peak of the curve 152 may not be sharp and accordingly the peak value, P$_p$ obtained at step 150 is modified by forming a weighted average P$_w$ of a selected portion of correlation values around the peak P$_p$ at step 154. The parameter value, ΔT$_{(w)}$ which yields the weighted average peak correlation P$_{(w)}$ is determined at step 156 and used as the acoustic wave parameter for the set of waveforms.

FIGS. 14, 15, 16, 17, 18 and 19

One method for automatic determination of an acoustic wave parameter, such as the velocity of the compressional wave, while a tool 10 is advanced along a borehole is shown in FIG. 14 with a signal processor 40. A processor suitable for processing of waveform signals may be such as identified as a PDP-11 and manufactured by the Digital Equipment Corporation. A first step 160 involves the regular actuation of the transmitter 16 and sequential enabling of receivers 18.1, 18.2, 18.3 and 18.4. As each sonic receiver is enabled, it produces a waveform 30, which in step 162 is converted to samples. Each waveform is converted to a group of samples 62 as previously explained with reference to FIG. 2. Actuation of transmitter 16 occurs independently of the operation of the conversion of the waveforms to samples. The conversion, however, as illustrated in FIG. 2, is completed before the next transmitter pulse is generated.

Each group of samples representative of a waveform is transferred at step 164 to a buffer in which the groups are assembled at step 166 to accumulate a set of waveforms from different receivers 18. In the method shown in FIG. 14 a buffer capable of storing a pair of sets of waveforms is used. Accordingly, a decision is made at step 168 to determine which buffer is full by sensing a buffer switch, BUF. When its value is less than one, the sampled set of waveforms is stored in a first buffer, BUFFER (0) at step 164; but if BUF is not less than one, the set is stored in a second buffer, BUFFER (1) at step 164'. The value of BUF is shown altered at steps 170–170' after each storage step 164 to steer the next set of waveforms into a buffer whose waveforms have been processed.

Each group 62 of waveform samples is formed of 512 samples, each indicative of the amplitude of the receiver waveform at the time of sampling. Hence, each set of waveform samples thus contains 2048 samples in which each group 62 is appropriately identified as having originated from a particular receiver 18 with a receiver code generated by tool 10 and made available along line 50 as explained with reference to FIG. 1. When a set of waveform samples has been assembled, a pointer may be applied to the appropriate buffer to indicate the presence of a new set for processing.

Since the index position N of each sample in its group also determines the time that sample was made relative to the transmitter pulse, an index position number may be attached to each sample by appending a nine bit word to the assembled sets at 172. Such index identification can be added by scanning a set of groups and appending the value of a counter which is incremented following the count of each sample in a group. Alternatively, where the additional word length is not conveniently used, the index position for each sample in a group can be determined by scanning the entire group and thus compute a sample's address.

When a full set of waveforms has been assembled, the velocity of the compressional wave is detected with a multiple fold (R-fold) correlation process generally indicated at 174 in FIG. 14. The multiple fold correlation involves a four-fold process in light of the use of four receivers, R. The input parameters for the multiple fold correlation 174 are entered at 176, such as the input velocity range of ΔT, ΔT MIN and ΔT MAX, a correlation window, WIND to determine the extent of correspondence between waveform segments and a value, DDT, for incrementing ΔT during the correlation process. The values for ΔT MIN and ΔT MAX may be determined as explained with reference to FIG. 13.

The multiple fold correlation is determined between samples whose index positions in the groups of waveforms are changed as a function of a range of wave velocity values for ΔT. The initial value for ΔT is set at 178 equal to ΔT MIN. The index locations for the correlation windows are determined at step 180 as a function of ΔT and the multiple fold correlation C(ΔT) computed at 182. After each correlation computation, the value for ΔT is incremented at 184 by DDT, which may be, for example, as small as one microsecond, until correlation values for the entire velocity range for ΔT have been obtained. When the decision at 186 reveals that ΔT is equal to ΔT MAX, the upper part of the range, the correlation computations for the set of waveforms is complete.

The previously determined correlation values C(ΔT) have been stored in an array together with their associated values for ΔT. The array is then scanned at 188 to select a desired peak, indicative of the best correspondence between correlated window segments. The value for ΔT which yielded the best correspondence is selected at 190 as the wave velocity for the particular set of waveforms.

A decision is made at 168′ by testing BUF for which buffer is to be used for a new set of waveform samples. If BUF is less than one as tested at 168′ the waveforms which were stored in Buffer (0) are used at step 194 and the process continued at $C_4$. If BUF is not less than one, the set of waveforms stored in Buffer (1) is used to continue the process.

The above description for the method shown in FIG. 14 for the determination of the velocity of the compressional wave may be conveniently completed in real-time as each set of waveforms is produced. Since four different receiver waveforms are employed, the time available to complete the computation is determined by the period for cycling through four complete transmitter-receiver operations. When the transmitter is pulsed at a rate of about ten times per second, approximately 400 milliseconds are available and sufficient to complete a correlation computation with an automatically operated processor.

FIGS. 15, 16 and 17 illustrate additional and alternate steps for determining start locations for alignment of the waveforms in a set. In FIG. 15, method steps are shown which implement with greater detail the alignment steps 90, 92 shown in and described with reference to FIG. 7.

In FIG. 15 a first compressional wave motion is shown detected by initially obtaining at step 210 a measure or gauge value of the magnitude of a waveform such as 30.1 (see FIG. 2). Thereupon at 212 in FIG. 15 a threshold value, which bears a predetermined relationship to the measured magnitude, is obtained. The waveform is scanned again to compare it at 214 with the threshold value and the time index, L1, is noted when the waveform first exceeds the threshold value and the time index value L1 is then used at 218 as a starting place for the correlation window for that waveform 30.1.

The starting places for the other waveforms in the set are determined as a function of the spacings between the receivers. The method shown in FIG. 15 is particularly applicable for use with the sampled waveforms as employed in the process of FIG. 14. In such case the waveform samples are scanned at 210 and 218. Once the first sample which exceeds the threshold has been found at 214, the index value for that sample is determined and used to locate the correlation windows for the other waveforms.

As shown in FIG. 16 the gauge forming step 210 involves, for sampled waveforms, the scanning of a predetermined number of the samples in a first group to select the maximum and minimum values at step 220. This predetermined number may be all of the samples in a group or some other series of samples which include the segments of the waveform of interest. Hence, as used with respect to the methods for detecting first motions as described with reference to FIGS. 15–19 and in other FIGURES, the waveform scanning step may include all of the waveform or those initial portions of the waveform expected to represent the sonic wave of interest as well as an indication of the magnitude of the waveform in the vicinity of the sonic wave.

The gauge is an absolute number and can be considered a peak-to-peak measurement. The difference between maximum and minimum values is taken at step 222 to produce a measurement equivalent to the peak-to-peak value $A_1$ of waveform 30.1 shown in FIG. 1. A threshold value is then computed by selecting a predetermined portion of the gauge value. Such threshold value depends upon the amount of waveform which is scanned. When the scanning step is limited to waveform samples which include the compressional and shear waves, a threshold value is selected with a magnitude which is about ten percent of the gauge value. This fraction for the threshold may be varied, but its chief characteristic of being a function of the magnitude of the waveform is retained.

The first motion can then be detected by comparing the samples 60 (see FIG. 1) in the first group 62.1 of waveform samples with the threshold at 224 (see FIG. 16). When a sample exceeds the threshold, the index value in the group 62.1 for that sample, e.g. N1, becomes a measure of the time of arrival of the compressional wave at the first sonic receiver 18.1.

FIG. 19 illustrates with still greater detail a first arrival detection method 240 for detecting the first motion of the compressional wave as generally referred to in FIG. 15 at steps 210, 212 and 214. The method 240 is illustrated for use with a method of processing sampled waveforms as described with reference to FIG. 14. Hence, the method 240 is employed after a set of samples is available for processing after step 166 of FIG. 14.

A first waveform W1 of 62.1 (see FIG. 2) is scanned and the maximum and minimum values, respectively W1(MAX) and W1(MIN) and their associated index values N(MAX) and N(MIN) determined at 242. Note that the scanning step 242 may be limited to an initial portion of samples in group 62.1 in order to obtain a measure of the magnitude of the waveform in the vicinity of the compressional wave. The number of samples to which the scanning step may be limited depends upon the sampling rate and the time when sampling began following a transmitter pulse. Thus with reference to FIG. 18, the scanning step may be limited to the portion identified by bracket 243 or the entire waveform may be scanned. In the latter case, the peak-to-peak amplitude value at 245 is measured, while in the former case the gauge value is determined by the waveform at 247. The absolute difference between these sample values is then taken at 244 to establish a gauge value and a threshold (THR) in an amount of a fraction of the gauge such as ten percent of the gauge value is computed at 248.

The detection of a first motion is made by computing a discriminator value D(K) as a function of different index values K into the first group of samples 62.1. The discriminator is determined by the following computation.

$$D(K) = |A(K+R+5) + [A(K+R+4) + A(K+R+3)] - [A(K+2) + A(K+1) + A(K)]|$$

where the values A(K) represent samples at indices 0, 1, ... etc. depending upon the value of K. R represents a separation or skip factor expressed in number of index values. R is used to reduce sensitivities to waveform noise by separating the sequential waveform portions being compared. R tends to be greater when the sampling rate is low. Generally a value for $R \times 3$ is useful with sampling rates of the order of about four to eight microseconds. Other values of R, even zero, may be used to compare the sums of successive samples. Hence, in effect for an initial value of $K \times 0$, entered at 250, the absolute value discriminator D(K) is computed by forming a first sum at 252 of the first three successive samples 60.1, 60.2, 60.3, selected at 250. A second sum of three samples 60.4, 60.5 and 60.6 is formed at 254 and an absolute difference between the sums is taken at 256.

A comparison is then made at 260 as to whether the computed discriminator D(K) is greater than the threshold THR. If not, then the value of K is advanced, such as with an increment of one, at 262 and a new discriminator computed. When the decision at 260 is affirmative, the discriminator computation is terminated and the value for K(T) corresponding to the last value of the discriminator is selected at 262 as the index value for the first arrival of the compressional wave. This value is determined by the relationship $K(T)=[K+2+(R+1)/2]$. Upon completion of the first motion detection method 240, the start locations for the correlation determination method shown in FIG. 15 can be carried out.

The value of employing a first motion detection method such as 240 can be appreciated with reference to the waveforms 20.1 and 30.4 shown in enlarged form in FIG. 18. The waveforms are shown vertically aligned though their relative amplitudes are different. A conventional well known method for detecting the first motion involves the selection of a threshold 226 whose value is chosen at an optimum level selected to detect most first arrivals. Occasionally, a waveform such as 30.4 of generally smaller amplitude occurs with a first arrival 228 whose amplitude is less than the threshold thus causing "cycle skipping". The resulting first motion detection for waveform 30.4 will be in error by an amount dependent upon the location of the wave 230 which is sensed with the threshold.

With a first motion detection method as illustrated in FIGS. 15, 16 and 19 a variable threshold is used. The threshold is related to the general amplitude of the waveform, thus rendering the first motion detection a more reliable measurement.

The multiple fold correlation step 182 as previously described with reference to FIG. 14 involves the following four-fold correlation function:

$$C(\Delta T) = \sum_{K=1}^{K=WIND} W1(K)*W2(K + L2)*W3(K + L3)*W4(K + L4)$$

where the notations employed are those for a process language FORTRAN wherein the asterisk represents multiplication and the parentheses define index values. The use of FORTRAN terms is employed as much as appears practical. However, it is to be understood that deviations from the acceptable FORTRAN language terms may occur for clarity.

The term W1(K) in the last mathematical expression refers to the value of the first waveform W1 (30.1) from receiver 18.1 at an index position K and in a similar manner W2(K+L2) refers to the value of the second waveform W2 at the index position K+L2 with the identification of the other waveforms being similar.

In the computation of the four-fold correlation function C(ΔT), the initial value for ΔT is selected equal to ΔT MIN microseconds at step 178 in FIG. 14 and the correlation value computed over a window width entered at 176 in units for K as a number of samples. The window width may be varied. However, an increase in the window width is accompanied by an increase in the computation time needed to compute all the correlation values over the velocity range of ΔT MIN to ΔT MAX. A range for K covers a window whose width in samples is determined as a function of the sampling rate and frequency of the wave of interest to avoid erroneous alignments. Generally, the number of samples is selected to provide a window whose width is about one and a half cycles wide. Thus, for example, at a wave frequency of 12.5 KHz and a sampling rate of 6 microseconds, a window width of twenty samples is employed.

As previously mentioned, the correlation computation is made as a function of the wave velocity parameter, ΔT. This variable is introduced by selecting at 114 correlation starting places L2, L3 and L4 which respectively are computed as $L2=A*\Delta T/SR$, $L3=B*\Delta T/SR$ $L4=C*\Delta T/SR$ where A, B and C corresponds respectively to the distances $d_1$, $d_1+d_2$, and $d_1+d_2+d_3$ in feet or the spacings of receivers 18.2, 18.3 and 18.4 from receiver 18.1, and where SR is the sampling rate in microseconds. For the illustrated embodiment SR=4 microseconds, and $d_1=d_2=d_3=1$ foot, the values of $L_2$, $L_3$ and $L_4$ equal respectively $\Delta T/4$, $\Delta T/2$, and $3\Delta T/4$.

As a result of the first arrival detection method 240 in FIG. 19 the subsequent correlation computations are begun at index positions which are more closely located to the waveform regions of interest. The initial starting points L2, L3 and L4 are computed on the basis of an initial highest velocity value, or lowest transmit time in microseconds per foot, of the compressional wave in the range, i.e. ΔT=ΔT MIN using the relationships previously set forth for L2, L3 and L4. When the starting values L2, L3 and L4 have been computed, the correlation computations are formed at 182 in FIG. 14 according to the above relationship for C(ΔT).

In the computation of a four-fold correlation as shown in FIG. 15, the correlation starting point, L1, in the first receiver waveform 30.1 is determined on the basis of a detected first motion. The correlation starting points in the remaining waveforms is then determined by computing a lag from that detected first arrival. The lag is initially based upon the highest velocity (or lowest transit time value ) for the compressional wave within the selected range [ΔT MIN to ΔT MAX ]. Thereafter the correlation starting places L2, L3 and L4 for the remaining waveforms are determined as a function of incremented assumed values for the wave velocity in the range and the distance between receivers.

In FIG. 17 an alternate method, step 280, to determine the start locations for a four-fold correlation computation is shown. The correlation starting points in each of the digital waveforms 62 (see FIG. 2) are selected on the basis of the distance of the receivers 18 from the transmitter 16 as well as a range of assumed values of the wave velocity ΔT. Hence, the correlation starting places for the waveforms are determined by the relationship $$L1 = \frac{D(T_XR1)*\Delta T}{SR} - \frac{\Delta \tau}{SR} 1$$
$$L2 = \frac{D(T_XR2)*\Delta T}{SR} - \frac{\Delta \tau}{SR} 2$$
$$L3 = \frac{D(T_XR3)*\Delta T}{SR} - \frac{\Delta \tau}{SR} 3$$
$$L4 = \frac{D(T_XR4)*\Delta T}{SR} - \frac{\Delta \tau}{SR} 4$$

where $D(T_XR)$ relates to the distance between a receiver, R, and the transmitter $T_X$, SR is the sample rate and $\Delta\tau$ is the delay employed in commencing the A/D conversion as previously explained.

In the event the distances between the receivers and the transmitter are respectively 8, 9, 10 and 11 feet, the values for L are $$L1 = \frac{8\Delta T}{SR} - \Delta N1$$
$$L2 = \frac{9\Delta T}{SR} - \Delta N2$$
$$L3 = \frac{10\Delta T}{SR} - \Delta N3$$
$$L4 = \frac{11\Delta T}{SR} - \Delta N4$$

where $\Delta N$ represents the delay $\Delta\tau$ in units of number of samples.

In the event the A/D conversions begin without delays $\Delta\tau$, then values for $\Delta N$ are zero. In such case, however, end portions of the waveforms 30 may not be sampled if the group of samples is limited in number. Such deletion can be tolerated when the first arrivals are of prime interest.

FIG. 20

FIG. 20 shows a method 300 for operating the system of FIG. 1. While the tool 10 is being advanced at 302 (see FIG. 20) along the borehole 14 by a suitable drive, the sonic pulse transmitter 16 is repetitively energized to generate, for example, a first sonic pulse such as 26.1 (see FIG. 1) while receiver 18.1 is enabled to produce a waveform 30.1. When the waveform 30.1 arrives at the A/D converter 36 it converts the waveform 20.1 to a group of 512 samples 62.1 at step 302 and the waveform is stored at 304 in a buffer of processor 40.

This process of sonic pulse generating, sampling and storing is repeated in sequence for the remaining receiver waveforms as indicated with aid of a switch RN, initially made equal to 1 at 306. A test of switch RN at 308 checks for whether all receiver waveforms 30.1–30.4 have been assembled. If not, RN is incremented by one at 310 and steps 302, 304 repeated.

When an entire set of sampled waveforms are assembled in a first buffer at 312 and RN is returned to 1 at 306', wave velocity correlation computation such as 182 of FIG. 14 can be commenced.

Parameter inputs for the four-fold correlation computation are entered at 314 with the subsequent steps 182, 188, 190 for the multiple fold correlation computation as previously described for FIG. 14 whereby the value for $\Delta T$ is obtained for a set of waveforms.

Step 316 thereupon compares the value for $\Delta T$ with a predetermined number of previously determined values to achieve a smoothing effect. In light of the number of sonic pulses per foot of travel of tool 10 (about 10) rapid variations of $\Delta T$ are unlikely to occur. Hence, the smoothing by step 316 enables the program to reject excessive excursions of the determined $\Delta T$ by comparison with recently determined values.

For example, in carrying out step 316 of FIG. 20, the last ten values for $\Delta T$ may be stored and differences between these stored values and the last determined $\Delta T$ computed. Those values for $\Delta T$ which yield the three largest differences are rejected and an average value computed for the remainder including the last value. The average or smoothed $\Delta T$ value may then be plotted as a function of depth at step 318 on a plotter or stored in memory for further processing. A test is made at 320 for the presence of new waveforms for processing. If none occurs within a preset time, the process is stopped at 322.

FIGS. 21A Through 21H

With reference to FIGS. 21A–21H a method for determining the velocity of compressional waves with four-fold correlation steps suitable for execution with a programmable processor is shown with greater detail. The steps in FIGS. 21 are shown for a processor which has access to sampled waveforms either from an A/D converter 36 or from a sample record 47 recorded on a magnetic tape. The terminology employed in FIGS. 21 is particularly useful for controlling a programmable signal processor such as the previously referred to PDP-11. Process terms generally rely upon a well known FORTRAN language for such functions, though deviations therefrom may appear at times for clarity.

The waveform samples are loaded into a processor 40 which retrieves groups of samples as a set of waveforms from a pair of buffers. The buffers are alternately loaded with a set of samples while the processor alternates between the buffers by selecting a set of waveforms from one buffer for wave velocity computation in a first pass and from the alternate buffer in the next pass. The computations and processing for the samples in each buffer is the same.

Figure 21A:
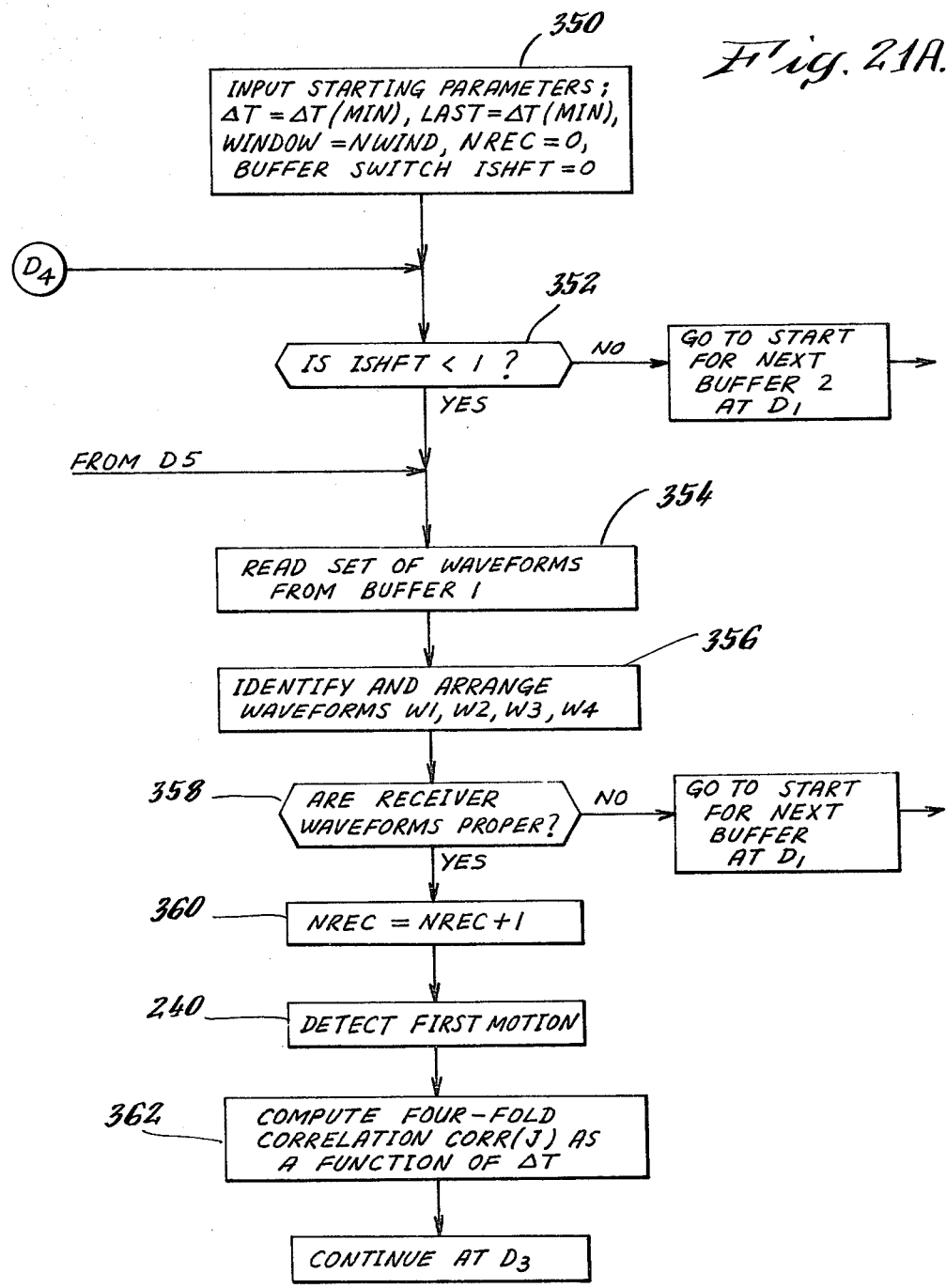

The organization of FIGS. 21A through 21H is arranged so that the flow charts of FIGS. 21A and 21B reflect the processing steps in a general manner while those for FIGS. 21C–21H set forth the same steps with expanded detail.

Hence, with reference to FIG. 21A, input parameters are entered at 350. The inputs include the most recently computed value for $\Delta T$, identified as LAST, which initially is made equal to $\Delta$TMIN in microseconds per foot. The set of waveforms being processed is designated with the record symbol NREC and initially equals zero. The value of a buffer switch, ISHFT, similar to BUF at 168 in FIG. 14 is made equal to zero. The size of the correlation window, NWIND, is also entered as an input value at 350.

A test is made at 352 whether the first buffer contains a set of waveforms. If the decision is negative, the program jumps to the location $D_1$ at the beginning of FIG. 21C where the next set of waveforms in the second buffer can be processed. When the decision at 352 is affirmative, the process continues at 354 by reading in a first set of waveforms W1, W2, W3 and W4 from buffer 1.

It can occur that the groups of samples from the receivers 18 are not stored in the buffer in the sequence by which the waveforms were generated as shown in FIG. 2. In such case the order of the groups must be identified and arranged for subsequent processing.

Accordingly, at 356 in FIG. 21A the receiver codes appended to the waveforms are interrogated to identify the groups, determine index values for the samples and arrange the waveforms in the order of the desired sequence W1, W2, W3 and W4.

A test is made at 358 to assure that each waveform includes the proper number of samples. This is done by checking the receiver code locations for each waveform W and continuing the number of samples between receiver codes. If the count is equal to 512 samples for each waveform, the process continues. If not, the process continues at $D_1$ in FIG. 21C to continue with the set of waveforms in buffer 2.

When the set of waveforms in buffer 1 satisfies the requirement of test 358, the waveforms in the set are accepted as a logging record, and the latter, NREC, is incremented by one at 360.

The first arrival of the compressional wave is then detected with a method such as 240 in FIG. 19 and the four-fold correlation values CORR(J) computed for the set of waveforms in buffer 1 at 362 starting the correlation window at locations obtained in a manner as previously explained with reference to FIG. 15.

The determination process is continued at $D_3$ in FIG. 21B by scanning the correlation values CORR(J) at 370 and the maximum value CORRJMAX is selected along with the $\Delta T$ value which yielded this maximum correlation.

A weighted average of a predetermined number of correlation values CORR(J) is then computed at 372. For example, the seven values of CORR(J) on both sides of the peak CORRJMAX are selected to obtain a weighted average CORRJWT. Thereupon, the value of $\Delta T$ corresponding to the weighted average CORRJWT is computed at 374 and selected at the $\Delta T$ value for the set of waveforms.

The $\Delta T$ determination is then smoothed by selective averaging with previous values at 376 in a similar manner as previously described with reference to step 316 in FIG. 20 to obtain a $\Delta T$ value for display by plotting at step 378. The plotting step may be deleted when desired and the value for $\Delta T$ both before and after smoothing stored for subsequent retrieval.

At this point the buffer switch is changed by setting ISHFT=1 at 380 in FIG. 21B. The process is returned by the instruction 382 to the start of buffer switch 352 in FIG. 21A. The execution of the decision 352 causes the process to be continued at $D_1$ in FIG. 21C.

When the next set of waveforms is to be processed starting with the steps shown in FIG. 21C, the first step 390 reads in a new set of waveforms W1, W2, W3 and W4 from buffer 2.

The identification arranging and indexing step 356' for the set of waveforms to be processed in the method of FIG. 21C as well as the test 358' are as previously described with reference to FIG. 21A. Note that a negative decision at 358' returns process control to the position as denoted in FIG. 21A. The log record NREC for the set of waveforms is incremented at 360' and the first arrival detection routine 240 for waveform W1, such as from receiver 18.1 entered with input parameters.

The entry step 392 for input parameters for the first arrival detection process 240 includes a reading of a starting index value, N1, where the first waveform W1 is initially investigated; the last index value, NL, before which the first sonic wave is likely to have arrived; and the proportion factor, RATIO to be used to establish the threshold value THR.

The location for the first N1 sample is computed at step 394. If the index N1 is the same as the first sample 60.1 (see FIG. 2) in the waveform 30.1, the address for that is determined at step 394. If the value of N1 is greater, such as may occur if it is desirable to commence the first wave detection further into the waveform, the address is correspondingly changed. Once the address of N1 is known, the subsequent computations are carried with reference thereto.

The size of a window DN is determined at step 396 and the samples in the window scanned for maximum and minimum samples by initially setting AMAX and AMIN to extreme values at step 398 and the process continued at $D_6$ in FIG. 21D.

A counter is made equal to DN at 410 in FIG. 21D and an integer K is made equal to the index value N1 corresponding to the first sample in the window DN. A test 412 then checks whether the amplitude A of sample A(K) is a maximum. If it is, AMAX is made equal to A(K) at 414 and the next test 416 for a minimum value is made. When test 416 is affirmative, AMIN is replaced by the value of the sample A(K) at 418. This process is repeated by checking the amplitude A of each sample in the window DN by decrementing the counter by one and incrementing K at step 420. When the counter test 422 indicates that all samples in the window DN have been checked for maximum and minimum values, AMAX and AMIN reflect the high and low peak values of waveform W1 in the window DN.

Note that particular sections of the waveform W1 can be scanned by appropriate selection of the values N1 and NL. Preferably, however, the entire group of samples in waveform W1 is scanned for maximum and minimum values.

The threshold, THR, is then formed at step 424 by computing RATIO* [AMAX−AMIN] wherein RATIO is a comparison factor based upon its input value. This as previously described may be set in the vicinity of one-tenth (0.1) to establish a threshold THR of about ten percent of the absolute difference between AMAX and AMIN.

The counter is made equal to zero and K is made equal to the first index value N1 of window DN at 426, while R is made equal to an integer M having, for example, a real value of three. The discriminator D(K) as previously described with reference to FIG. 19 is computed at step 428 and the value for D(K) compared with the threshold value THR at 430. The comparison is continued by incrementing the counter and K at 432 until the test 430 is affirmative. The index value of the first wave arrival in the first waveform W1 is computed at 434 as LAG1 with the relationship LAG1=[K+2+(R+1)//2]. If R is zero, the value of LAG1 is rounded to the lowest whole integer value. In practice, however, some separation between the different sums is used by giving R a value which is greater than zero, such as three. The value of the counter may be used to limit the range of computations.

The operation of the discriminator D(K) can be visualized with reference to the waveform curve 436 in FIG. 21D. The separation of the sums is denoted by R while the index value for LAG1 is midway between the sums. The value for LAG1 is used as the actual first arrival with all correlation computations thereafter being referenced thereto.

Figure 21E:
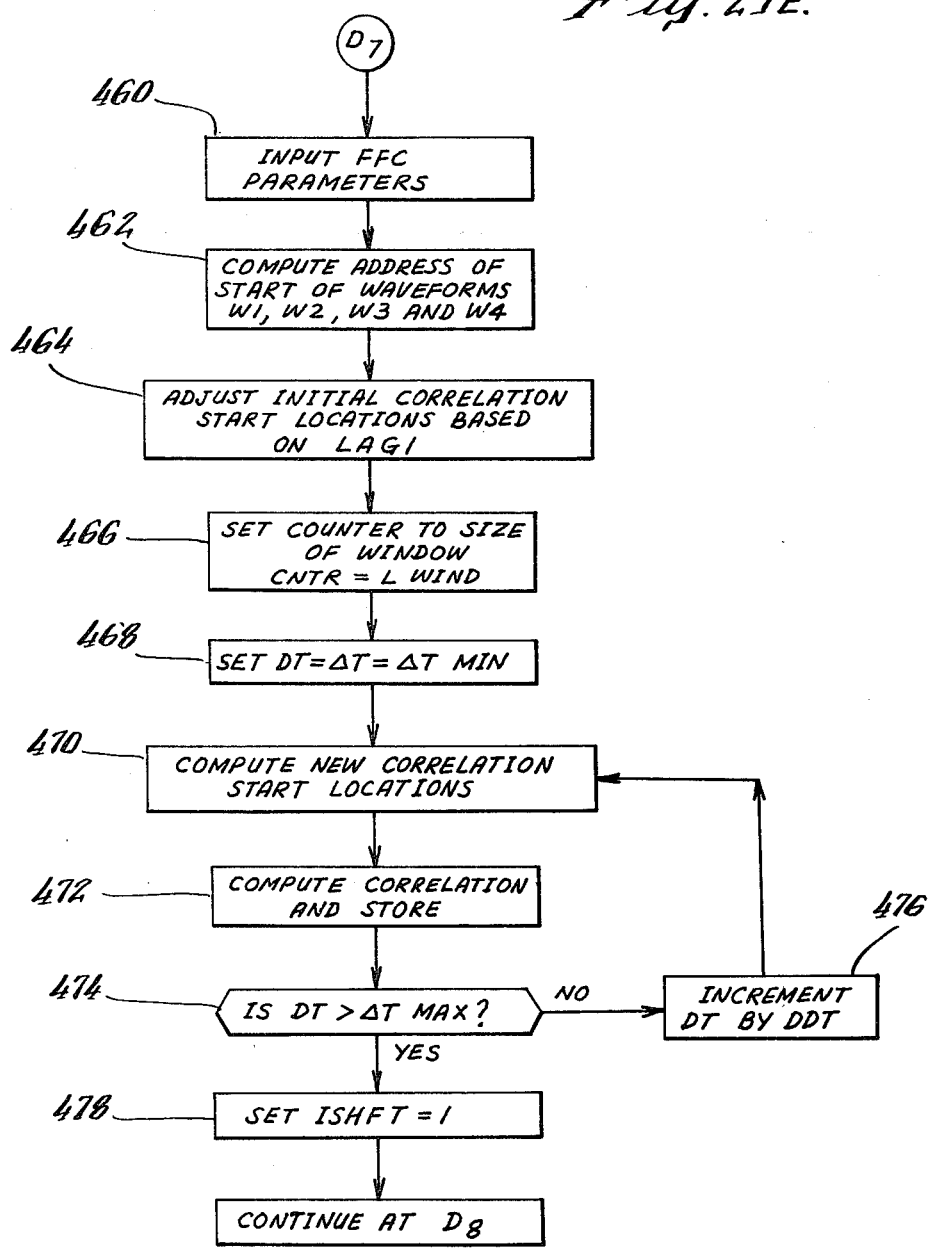

The process is continued at $D_7$ in FIG. 21E where the value of LAG1 becomes an input to the four-fold correlation subroutine FFC shown to start at 460 in FIG. 21E.

Inputs are entered at 460 for the four-fold correlation routine and include the index for the first wave arrival LAG1; the value for sampling rate SR; the length of the correlation window LWIND in number of samples; DDT, a value used for incrementing the correlation variable $\Delta T$; and an initial value for the correlation variable $\Delta T$. In addition an input range for $\Delta T$ is provided in the form of $\Delta$TMAX and $\Delta$TMIN. Practical values for these input parameters may be, SR=4 microseconds, DDT=1 microsecond, $\Delta$TMIN to $\Delta$TMAX=40 to 220 microseconds. An array of samples obtained from buffer 2 is used as a complete set of waveforms W1, W2, W3 and W4. Alternatively, a method such as described with reference to FIG. 13 may be used to select input values for ΔTMIN and ΔTMAX.

An initial step at 462 involves the computation of the starting addresses for each of the waveforms W1, W2, W3 and W4. These addresses can be found by checking for receiver codes or counting down the number of known samples in each waveform.

The initial correlation start location for the first waveform W1 is then determined, based upon the previously detected first wave arrival LAG1 in the first waveform W1. In addition, adjustments are made for the start locations in the remaining waveforms W2-W4 by delaying or shifting addresses of the samples in these waveforms by an amount equal to LAG1 samples at step 464.

A counter, CNTR, is set equal to the width of the correlation window, LWIND, at 466 and the initial value of DT set equal to ΔTMIN at 468.

The correlation start locations for waveforms W2, W3 and W4 are then obtained by computing the values for L2, L3 and L4 at step 470. The values for these shifts are computed on the basis of the relationships set forth with reference to the description of FIG. 14. The values for L2, L3 and L4 are expressed in and rounded off to the nearest whole number of samples to determine the appropriate correlation starting indices.

A four-fold correlation is thereupon computed at 472 based upon the following relationship:

$$\sum_{K+LAG1}^{LAG1+LWIND-1} W1(K)*W2(K + L2)*W3(K + L3)*W4(K + L4) = COOR(J)$$

and the result stored as a correlation value CORR(J) associated with a particular value for DT or ΔT. The multiplication of the four values of W1, W2, W3 and W4 are made for each sample in the window LWIND. After each set of multiplications, the next four waveform values are multiplied and the result added to the previously multiplied set. When all corresponding window samples in respective waveforms have been multiplied and summed, the final number is a correlation value CORR(J).

After each correlation computation, a test 474 is made whether the full range of values for ΔT has been explored by comparing the value of DT with ΔTMAX. If the result is negative, the value of DT is incremented at 476 by DDT and a new correlation CORR(J) obtained for new values L2, L3 and L4.

The incremental changes of DT can be made very small, of the order of one microsecond even though the sampling rate is four microseconds. The value of DDT may be further reduced when the intervals between the samples can also be lowered.

Figure 21F:
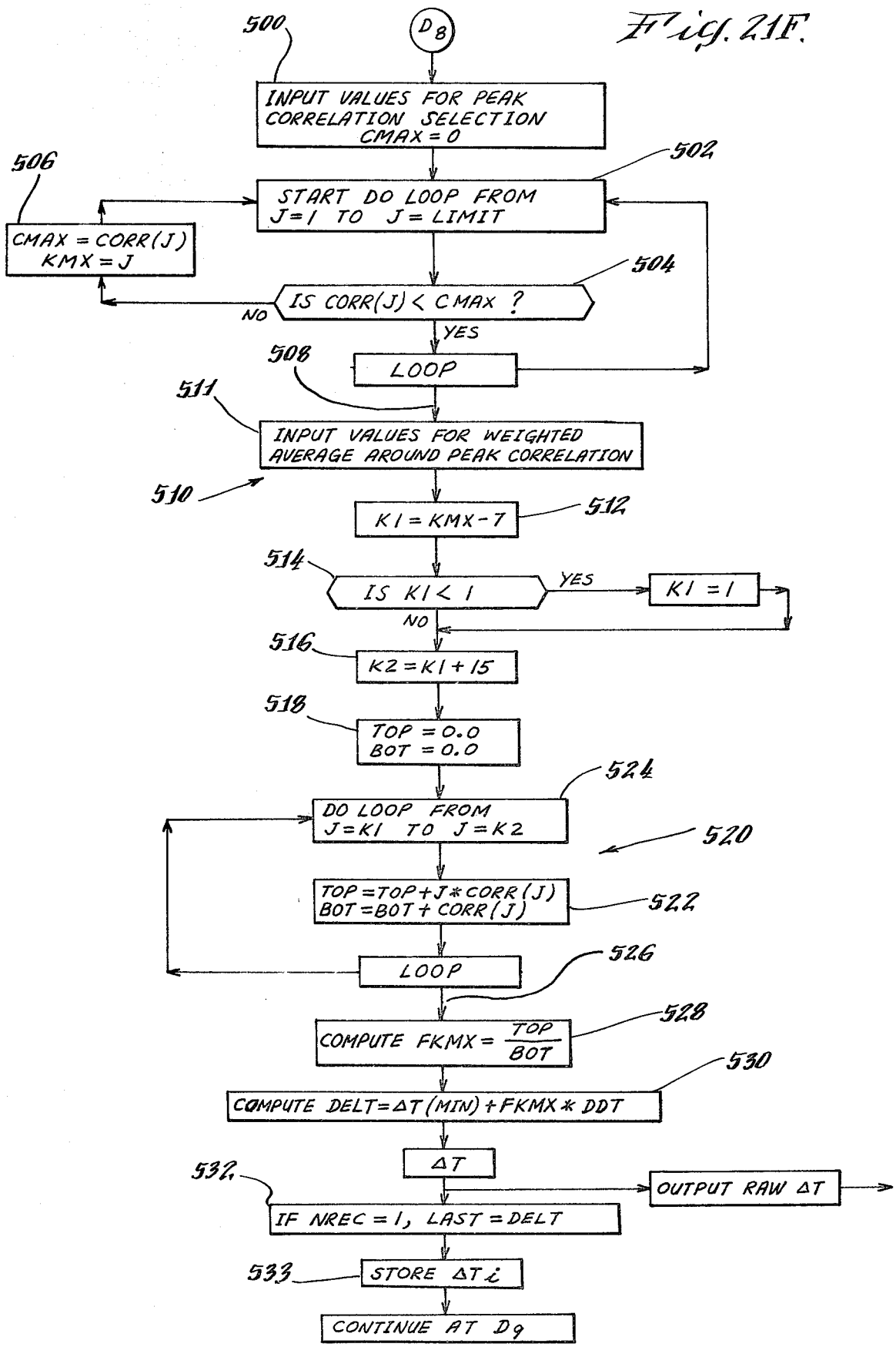

When correlations between samples in the waverform windows have been completed, the buffer switch ISHFT set equal to 1 at 478 and the process continued at D8 in FIG. 21F.

When the correlations for the set of waveforms have been determined, a desired best correlation value such as the peak value is obtained with steps set forth in FIG. 21F. Initial input parameters are entered at step 500 and include CMAX, a peak correlation value, and which is initially set very small such as zero. An integer KMX is to be used for the index corresponding to the peak correlation CMAX.

A DO loop 502 is entered to scan the entire array of correlation values CORR(J) for a maximum. The DO loop has an upper value LIMIT, which equals the number of correlation values that were computed. Since the number of correlations depends upon the range of ΔT values and the size of the increments DDT, the value of the LIMIT is entered at 500. For a ΔT varying in a range from 40 to 220 microseconds per foot and a DDT equal to one microsecond, the value for LIMIT is an integer equal to 181. When a reduced range is employed such as suggested by the method of FIG. 13, the value of LIMIT is substantially less.

The test 504 in DO loop 502 is whether the current value of CORR(J) is less than or equal to CMAX. Since the latter has an initially small value, the decision is at first negative so that CMAX is set equal to CORR(J) and KMX is set equal to J at 506. The DO loop 502 then repeats the test for next successive values of CORR(J) until at the end of the loop at 508 all the correlation values (up to the value of LIMIT) have been scanned. At this point a peak correlation value CMAX is stored together with its index value KMX.

A weighted index average is then computed at 510 around the peak correlation CMAX. The weighted index average extends over seven values on both sides of the peak correlation and corresponding input values are entered at 511. At 512 K1=KMX−7, where K1 is the lower index value for the correlation values to be averaged. Since KMX could occur near the beginning of the waveforms, a test is made at 512 whether K1 is less than 1. If so, K1 is made equal to 1. K2 defines the upper index of the correlation values to be averaged and equals the index value K1+15 as indicated at 516.

One weighted average may be determined by the following relationship:

$$FKMX = \frac{\Sigma J*COOR(J)}{\Sigma COOR(J)}$$

The numerator of the weighted average is defined as TOP and is initially made equal to zero, and similarly the denominator is defined BOT and is made equal to zero at 518.

A DO loop 520 is entered to form the sums for TOP and BOT at 522 with the start of the loop determined at K1 and the upper limit made equal to K2 at step 524. When the loop is completed at 526, the values for TOP and BOT are equal to the sums set by the relationship for FKMX. A division of TOP by BOT is made at 528 to yield the weighted average value FKMX for the correlations.

FKMX at this point represents the index value for the desired maximum correlation value. Since the indices in the correlation occur at intervals equal to DDT for values of ΔT from an initial value of ΔTMIN, the value of ΔT is computed at step 530 by the relationship ΔT=ΔTMIN+FKMX*DDT. With ΔTMIN=40 and DDT=1, the computation for ΔT becomes ΔT=40 +FKMX and the value of ΔT as obtained by the four-four correlation determination is available at the end of step 530.

The value for ΔT, DELT, determined at step 530 is considered a raw measurement prior to smoothing. This value of ΔT can be stored or plotted at this point as may appear desirable.

A smoothing process such as 376' shown in FIG. 21B is employed to compare a number of previously computed values for ΔT with the most recently determined value, DELT. If the current set of waveforms being processed is the first, as detected by the record test at 532, the value for ΔT obtained from the computation 530 is used as the most recent or LAST value.

Figure 21G:
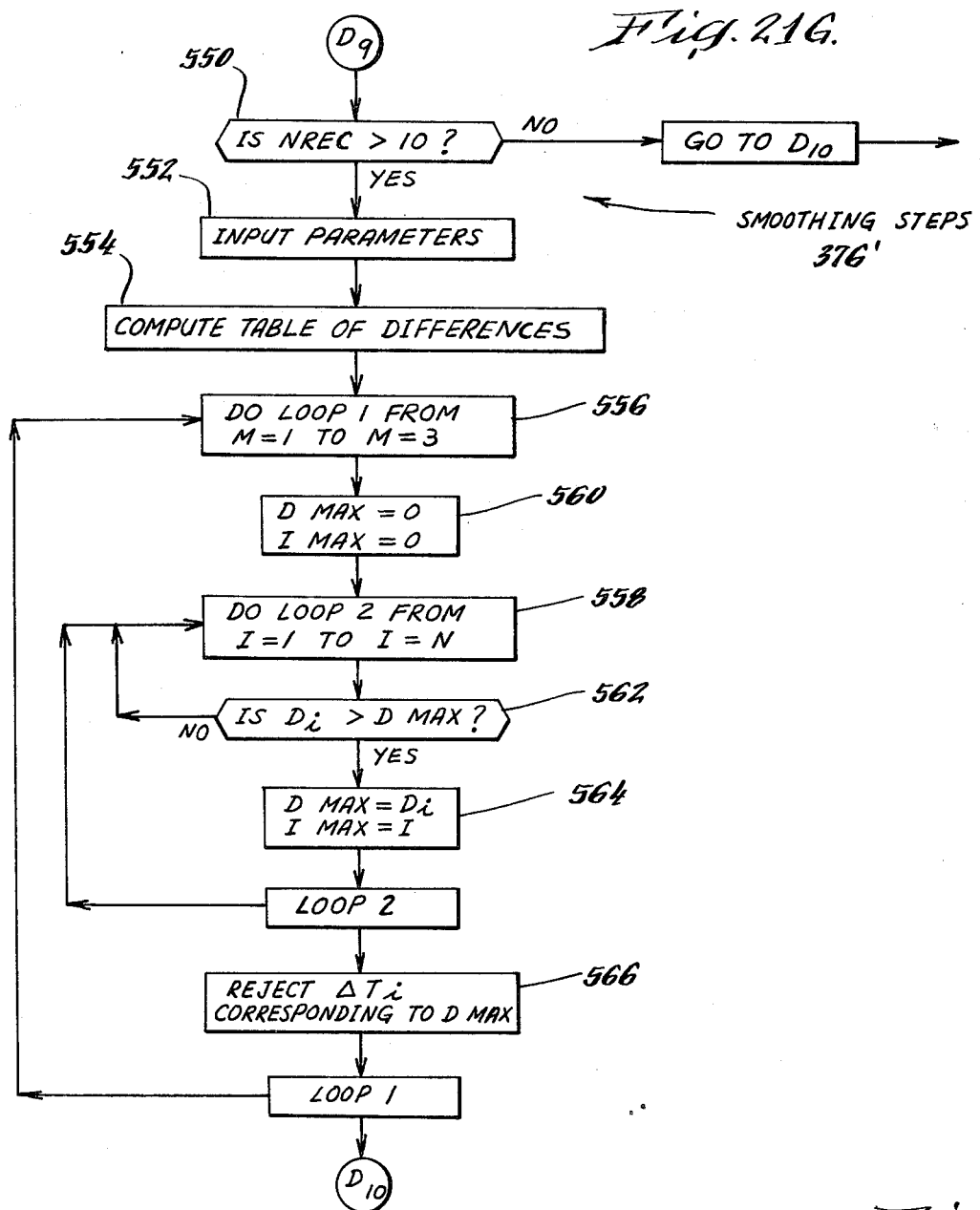

With reference to FIG. 21G, the smoothing process 376' is shown to be used after a predetermined number of sets of waveforms have been processed for ΔT computations. A test is made at 550 in FIG. 21G whether NREC is greater than a preset record such as ten, if not, the smoothing process 376' is bypassed and the process continued at $D_{10}$ in FIG. 21H. When at least ten sets of waveforms have been processed, the ΔT smooth process 376' is entered at 552 with an entry of input parameters.

The input parameters at 552 include an array $\Delta T_i$ of, for example, N=10 previously determined values for ΔT, and a rejection number such as M=3 entered as the number of ΔT values which are to be dropped from the array A before smoothing. The number of ΔT values employed in the array may be varied. When less values are employed, a lower rejection number M is used.

A table of differences $D_i$, is then computed at 554 for all the values in the array based upon the relationship:

$$D_i = |\Delta T_i - \text{LAST}|$$

where LAST is the most recently determined value for ΔT. Since ten ΔT values are in the array, as many differences are computed and stored with the ΔT values with which these differences were obtained.

A pair of DO loops 556 and 558 are then entered and executed to scan the table of differences and reject those array values which yielded the three largest differences. The first or outer loop 556 controls the number of rejects and the inner loop 558 controls scanning of the remaining array.

A maximum difference, DMAX and its associated index value IMAX are initially made equal to zero at 560 before entering the inner DO loop 558 and perform test 562 for a maximum difference value $D_i$. Whenever the test 562 is affirmative, the last difference value is used at 564 as the maximum DMAX and its associated index value IMAX stored to enable retrieval of the ΔT associated with DMAX. When the decision of test 526 is negative, the inner loop is repeated for the next $D_i$ value.

After the inner loop 558 has scanned the entire table of differences, the value of $\Delta T_i$ which yielded the DMAX is set at 566 equal to zero and its associated $D_i$ is set to an insignificant value such as −1. This effectively rejects the value of ΔT which deviated from the most recently measured value of ΔT stored as LAST. This process is repeated three times by the outer loop 556 to effectively remove the three largest ΔT deviations. These rejections constitute an initial smoothing step which can be varied by increasing or decreasing the number of rejects.

Figure 21H:
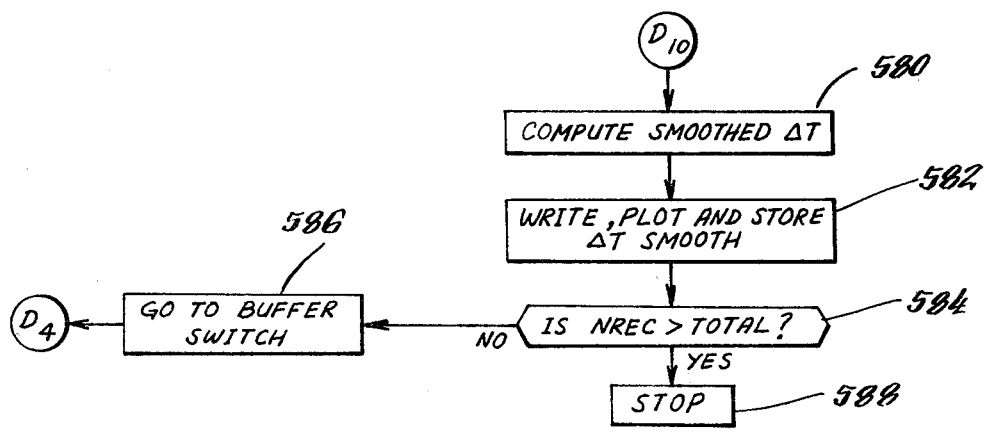

With the rejected values of ΔT in the array set equal to zero, an average is computed at 580 in FIG. 21H for those N−M values of $\Delta T_i$ remaining in the array. The averaging relationship is:

$$\Delta \text{TSMOOTH} = \sum_{i=1}^{i=N} \frac{\Delta T_i}{N - M}$$

The value of the smoothed ΔT is plotted, written or stored as may appear desirable. Preferably, ΔTSMOOTH is plotted as a function of depth for direct display at 582. Upon completion of the display or indicating step 582, a test 584 is made whether a maximum total of waveforms sets has been processed. If not, the next set of waveforms is processes as required at step 586 causing a return to the buffer switch 352 in FIG. 21A. If the decision from test 584 is affirmative, the process is halted at 586.

FIGS. 22, 23, 24, 25A and 25B

FIG. 22 illustrates a pattern detection method 650 for measuring a wave's velocity from a set of waveform samples by making a pattern comparison between waveforms. The pattern comparison method commences with the step 652 of producing waveforms. The waveforms may be generated in analog or sampled form and obtained in real time from receivers 18.

When a set of waveforms has been generated, the first motions in a pair of waveforms W1 and W2 are detected with step 654, using a method such as explained with reference to FIGS. 15, 16 and 19. The detections of the first motions identify the time when these arrivals are detected relative to the time of occurrence of the transmitter pulses which caused the waveforms. These first arrivals can thus provide an initial measurement of the transit time for the compressional wave by comparing the times for these first arrivals. A pattern comparison is then carried out to generate a correction factor for the initial transit time measurement so that an accurate velocity measurement for the compressional wave can be obtained.

At step 656, different segments of the waveforms around the measured first arrivals are selected for combining at step 658 in a manner which reflects the correspondence between the selected segments.

The segment selection step 656 involves varying the relative time positions or alignments of the segments so that a range of pattern values can be produced when these differently aligned segments are combined. These pattern values are then scanned at step 658 to determine the best pattern value which reflects the best correspondence between segments. The relative time position of the segments which yielded the best pattern value is then used at 660 to provide a comparison correction factor for refinemnt of the initial transit time derived from the first motion detection step 654.

FIG. 23 illustrates additional process details for carrying out steps such as 658 and 656 of FIG. 22. The method steps of FIG. 23 are particularly useful in connection with a set of sampled waveforms and are intended for use with a processor such as described usable for the method shown in FIGS. 21.

At 670 input parameters are entered such as the width or number of samples in the pattern segments, WIND. In addition, a comparison range, KMAX, is entered as an index value to enable the pattern comparison method to be restricted within a desired range of samples in the vicinity of the detected first motions.

An initial set of waveform samples are then selected at 672. The segment of waveform samples for waveform W1 commences at index N1 corresponding to the first motion detection sample, while the segment for waveform W2 commences at an index value determined by the index for the detected first motion sample, N2, plus an increment factor K.

The corresponding samples in the segments selected at step 672 are compared and their differences summed at 674 to establish a pattern value. FIG. 24 illustrates further details for these steps where at 676 absolute differences between corresponding samples in a segment are formed. These differences are summed at 678 to yield a pattern value P(K) indicative of the correspondence between segments. The pattern value P(K) is stored at 680 together with an index number represented by K indicative of the relative alignment between segments.

A test is made at 682 in FIG. 23 as to whether all the pattern values have been determined. If not, the value for K is incremented at 648 and steps 672, 674 and 682 repeated. When the test 682 yields an affirmative answer, next steps such as 658 and 660 in FIG. 22 are performed to obtain a corrected velocity determination.

Figure 25B:
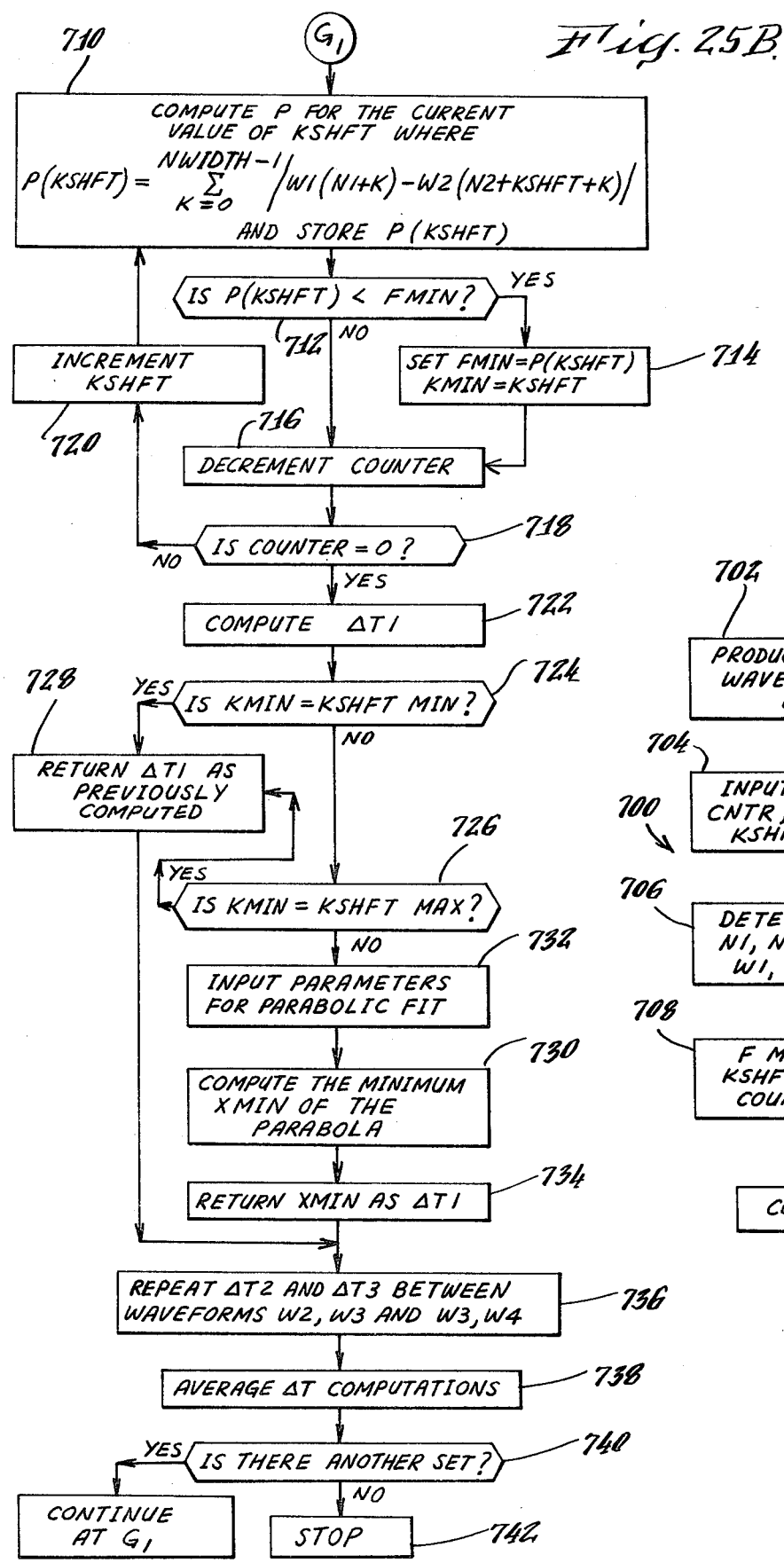
FIGS. 25A and 25B are flow charts of more detailed steps for use with the method shown in FIG. 24.
Figure 25A:
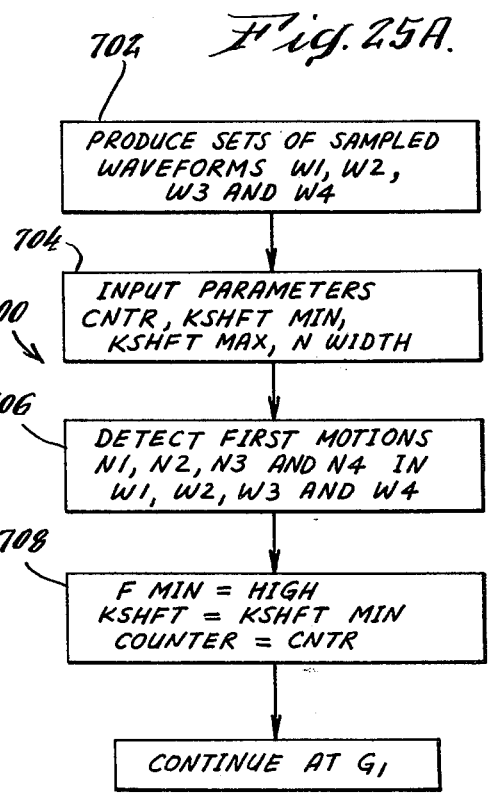

FIGS. 25A and 25B show a pattern comparison method 700 for determining the velocity, $\Delta T$, of a compressional wave with further step details. The pattern velocity measuring process commences at 702 with the step of producing a set of sampled waveforms W1, W2, W3 and W4 for investigation. Since the speed of completing the method 700 can be very high, the waveforms may be produced directly in real time from receivers 18 during a sonic borehold investigation.

At step 704 input parameters are entered. These include a number, CNTR, which determines the number of pattern comparisons to be made and limit values for variable, KSHIFT, as identified by KSHFT MIN and KSHFT MAX. A value K is entered to establish the index sample in the segments being compared. The number of samples, NWIDTH, in each comparison segment is also entered at 704. The width of the segments generally is selected on the basis of the sampling rate SR.

The first motions for waveforms W1-W4 are detected with step 706 using a method such as previously described with reference to FIG. 19. The first motions are identified by index values N1, N2, N3 and N4. These index values are referenced with respect to the first samples in each waveform. In the event the waveform sampling was delayed by a time period $\Delta\tau$ as previously explained with reference to FIGS. 2 and 3, the latter delay factor is to be included in a determination of the compressional wave transit time from index values N1, N2, N3 and N4. However, when no such delay $\Delta\tau$ was employed and sampling began with the time of occurrence of a transmitter sonic pulse, the difference in index values for the first motions, such as, for example, N1 and N2, is related to the compressional wave velocity or transit time by the relationship $(N2-N1)*SR$ where SR is the sampling rate in microseconds.

At step 708 in FIG. 25A several initial values are determined for FMIN, the lowest pattern value determined at step 710; KSHFT a variable which enables one waveform segment to be moved relative to the other and is initially made equal to the lowest value in the range, KSHFT MIN; and a counter is made equal to the value of CNTR.

Pattern comparison values P(K) are formed at 710 in FIG. 25 between samples in selected waveform segments of waveforms W1 and W2 according to one relationship as follows:

$$P(KSHFT) = \sum_{K=0}^{NWIDTH-1} |W1(N1 + K) - W2(N2 + K + KSHFT)|$$

where KSHFT varies from KSHFT MIN to KSHFT MAX which, for example, may have the values of $-3$ and $+3$ respectively. KSHFT varies at intervals of one. The locations of the waveform segments are determined by the index notations for the waves. Thus the segment for wave W1 is initially located with its lowest index valued sample at N1 for K=0. The lowest index value for the segment for wave W2 is initially located at index value N2+KSHFT. Since KSHFT has an initial value of KSHFT MIN, the second segment is effectively aligned at an earlier index position with respect to the segment for waveform W1 as determined by the value of KSHFT MIN.

The pattern values P(KSHFT) are obtained by initially forming absolute differences between corresponding window samples for all values of K and the sum of the differences is stored together with the value for KSHFT.

A test 712 is made whether P(KSHFT) is less than FMIN and since the latter has an initially high value, the result is affirmative. FMIN is then replaced by the pattern value P(K) and the value of KSHFT, namely $(-3)$ is stored as KMIN at 714.

The counter is then decremented at 716, and if the test 718 yields a negative answer, the value of KSHFT is incremented by one at 720 and the pattern computation repeated. This process continues throughout the range of KSHFT, i.e. for seven values, and when the entire set of seven pattern values have been computed, the lowest value P(MIN) reflecting the greatest similarity or correspondence between segments is stored as FMIN, and the associated index value for KSHFT is stored in KMIN.

A value for $\Delta T$ is then computed at 722 acccording to the relationship:

$$\Delta T = (N2 - N1 + KMIN)*SR$$

where SR is the sampling rate in microseconds and there is no $\alpha\tau$ delay factor as described with reference to FIG. 2 to introduce in the computation.

The best index value, however, is recognized as possibly being located at some intermediate value between samples. Accordingly, the adjoining pattern values P(KSHFT), around the lowest or best comparison value are used to form a best parabola fit. The index value where the parabola forms an actual minimum is then chosen as a correction to the $\Delta T$ measurement.

Such parabola fit, however, cannot be made if the best index value KMIN is located at the edge of the range for KSHFT. Accordingly, a test 724 is made to determine if KMIN is at the lower edge of the range, or at the upper edge with test 726. If either test result is affirmative, the previously computed $\Delta T$ at step 722 is returned with step 728 as the measured wave velocity value between waveforms W1 and W2.

However, when both tests 724, 726 result in negative answers, a parabola fit is made using the adjoining values P around KMIN. Thus the parabola fit is formed and its minimum index value determined at 730 according to the relationship $$XMIN = X1 - \frac{\Delta X^*(Y2 - Y1)}{2^*(Y2 + Y0 - 2^*Y1)}$$

where the parameters for this are entered at 732 as:

Y0 = P (KMIN−1)

Y1 = P (KMIN)

Y2 = P (KMIN+1)

X1 = ΔT (as determined at step 722)

ΔX = SR

The value for XMIN = ΔT is then used at 734 as the compressional wave velocity value ΔT1 measured between waveforms W1 and W2.

The previously described pattern comparison method is repeated at step 736 to measure the wave velocity values ΔT2 between waveforms W2, W3 and ΔT3 between waveforms W3 and W4.

When all three values, ΔT1, ΔT2 and ΔT3 have been measured, an average may be obtained at step 738 and used to represent the wave velocity for the set of waveforms. A test 740 is made whether additional sets of waveforms are present. If so, the ΔT pattern measurement process is repeated by returning to the step at $G_1$. When no further waveforms are available, the process is stopped at 742.

FIG. 26

The described methods for determining compressional velocity may also be used to obtain an indication of the shear wave velocity. As is well known in the art, the velocity of the shear wave is usually less than the compressional wave velocity so that the shear wave arrival occurs further into the waveforms 30 relative to the time of the transmitter pulse. In order to properly detect the shear wave, the compressional arrival is first determined. The compressional arrival is then used to select a region in the waveform where a correlation computation is carried out to determine the shear wave velocity.

A method 750 for determining the shear wave velocity is set with greater detail in FIG. 26. The steps shown in FIG. 26 assume that sets of sampled waveforms are available in a manner as previously described. Input values are entered at 752. These input values include those described with reference to FIGS. 14–19 for the detection of the first waveform motions of the formation or compressional wave and its transit time, ΔTC computation. In addition, input values for a shear wave transit time determination, ΔTS, using a multiple fold correlation technique are entered. The latter values are similar in kind to those previously described in connection, for example, with FIGS. 21A–21H.

The first motion indices are detected at step 754 using a process as described with reference to FIG. 19. Thereupon values for the compressional wave velocity ΔTC are formed at 756 using one of the techniques as previously described.

The estimate of the shear wave arrival step 756 is based upon the last computed value for the compressional or formation wave velocity ΔTC and the highest possible speed for the shear wave, i.e. 1.6 ΔTC. The relationship for determining the start of the shear wave arrival computation in the first waveform 30.1 (see FIGS. 1 and 2) is arrived at as follows:

$TF_c = WT + \Delta TC^*S$, where $TF_c$ is the time of arrival of the compressional wave in microseconds from the time of firing of the transmitter, WT is the time in microseconds for the compressional wave to transverse the borehole medium from the transmitter to the formation and from the formation to the receiver and ΔTC*S is the time in microseconds for the compressional wave to travel through the formation for a distance S between the transmitter and receiver.

In a similar manner, the time of arrival of the shear wave, $TF_s$, is determined by the relationship:

$TF_s = WT + \Delta TS^*S$, where ΔTS*S is the time in microseconds for the shear wave to traverse the formation for a distance S.

If the fastest shear wave is assumed, then $TF_s = WT + 1.6\Delta TC^*S = WT + \Delta TC^*S + 0.6\Delta TC^*S$
$= TF_c + 0.6\Delta TC^*S.$ The time of arrival of the compressional wave, $TF_c$, is determined at step 754 while the value for ΔTC is determined at step 756. Hence, the earliest arrival time of the shear wave can be estimated. The index for the start location for the first shear segment is determined by dividing $TF_s$ by the sampling rate SR to yield a first waveform shear log LSLAG1.

The start index locations for the shear wave in the other waveforms LS2, LS3 and LS4 are obtained at step 760 in a similar manner as described for the compressional wave with reference to FIGS. 21A–21H. Thus LS2 = (A*ΔTS/SR); LS3 = (B*ΔTS/SR); LS4 = (C*ΔTS/SR).

Where A, B and C correspond respectively to the distances $d_1$, $d_1+d_2$, and $d_1+d_2+d_3$ in feet of receiver spacings (see FIG. 10) and SWIDTH represents the number of samples in the shear segments being correlated. Thereupon the following four-fold correlation function is computed at step 762 as a function of ΔTS:

$$C(\Delta TS) = \sum_{K=1}^{K=SWIDTH} W1(K)^*W2(K + LS2)^*W3(K + LS3)^*W4(K + LS4)$$

The multiple fold correlation shear velocity computations are terminated with a test 764 whether the total range of shear correlations have been computed. A total shear range is generally limited to values from 1.6 ΔTC to 2.0 ΔTC. If test 764 yields a negative result, ΔTS is incremented at step 766 and steps 760, 762 repeated. After all shear correlation values have been determined, the best correlation is selected at 768 and its associated ΔTS value determined at 769.

Other processing steps such as the smoothing step 316 (see FIG. 20) may be performed before a plot 44 (see FIG. 1) of the shear velocity is made. Other steps useful in determining the formation velocity and described with reference to FIGS. 21A–21H may be employed when similar utility applies to the process for determining the shear wave velocity, ΔTS. A test 770 is made to determine whether additional waveforms need to be processed. If so, the shear velocity process 750 is repeated; if not, the process is stopped at 772.

FIG. 8

As previously mentioned the determination of a multiple fold correlation of waveforms 30 can be carried out in analog form with an apparatus 800 as shown in FIG. 8. The multiple fold correlation forming apparatus is shown coupled to process waveforms in real-time as they are generated by a sonic borehole logging tool. However, it is to be understood that waveforms, such as 30, can be derived from an analog storage medium such as a magnetic tape record or from a sample record whose samples are converted to analog form with a suitable converter.

Briefly, apparatus 800 operates by storing a set of four waveforms 30.1–30.4 on parallel tracks of a storage medium such as a magnetic disc 802. The stored waveforms are then played back under control by a delay network 804 to generate successively different segments which are combined to form correlations with an analog processing network 804. A permanent record of the generated correlation values is made with a suitable x-y plotter 806 which records the correlation values as a function of ΔT. A signal peak detector 808 may be used to select the best correlation value and the associated ΔT derived from the record made with plotter 806. Timing and control network 810 is provided to properly regulate the processing of waveforms 30.

Since the time required to complete the four-fold correlation with apparatus 800 may exceed the cycle time for generating a set of waveforms, a second signal processing apparatus 800' can be provided as shown and operated alternately with the apparatus 800. In such case the use of plotter 806 and peak detector 808 can be shared between apparatuses 800–800' by multiplexing techniques as are well known in the art.

The waveforms are generated with a sonic borehole investigating tool 10 such as described with reference to FIG. 1 and are made available through cable 12 to apparatus 800. A panel 24 such as shown in FIG. 1 may be used but has been deleted from FIG. 8 for clarity. The waveforms 30 are applied to a switch network 812 which includes a pair of analog logic amplifiers (not shown) for steering the waveforms 30 to either one of the apparatuses 800, 800'. A control network (not shown) such as a counter responsive to pulse signals representative of sonic pulses produced by the transmitter may be used to steer sets of four waveforms through analog logic networks to either of apparatuses 800, 800'.

The waveforms 30 are applied to a process control network 814 together with suitable waveform identification codes as previously described. In addition, pulses $T_X$, representative of the start of sonic pulses from the transmitter are delivered along cable 12. Network 814 includes a decode circuit such as 48 shown in and described with reference to FIG. 3 to enable the waveforms 30.1–30.4 to be respectively applied on lines 816.1–816.4 for recording on disc 802.

Lines 816.1–816.4 are respectively applied to analog logic amplifiers 818.1–818.4, which are, in turn, controlled with timing lines 820.1–820.4 from a timing network 822. The timing lines 820 provide enabling signals to amplifiers 818 and thus permit waveforms 30 to be recorded on separate parallel tracks on disc 802 with record/playback heads 824.1–824.4.

The recording of waveforms 30 on disc 802 may involve well known magnetic recording techniques, such as suitable drive amplifiers, erase modes and frequency compensation devices.

Timing network 822 is provided with receiver identification signals such as on lines 816.1–816.4 from network 814 as well as synch pulses, $T_X$, corresponding in time with sonic transmitter pulses 26 shown in FIG. 2. Enabling signals are produced on lines 820 corresponding in duration with the amount of waveform to be recorded. Such time enabling signal may be generated with a clock or single pulse generator in response to $T_X$ synch pulses.

The duration of the enabling pulses on lines 820 are further selected commensurate with the time lengh of a recording track on disc 802. For example, a track which is moved at a high speed, of the order of one revolution every five milliseconds, would be sufficient to record a four millisecond long waveform 30. In such case, the enabling pulses on lines 820 cannot be longer than five milliseconds to prevent a recording overlap.

When enabling signals on lines 820 of the order of about five milliseconds are used, a network such as 46 described with reference to FIGS. 1 and 3 may be dispensed with. However, if the rotational speed of disc 802 is increased to enable accurate recording of higher frequencies in waveforms 30, then such network 46 may be used to record the portions of waveforms 30 of specific interest.

A drive 826 for disc 802 is provided to operate the disc at a high, substantially constant speed. Drive 826 can be operated in synchronization with transmitter pulses, $T_X$, or with pulses derived from a synch track detected with record/playback head 824.5. The transmitter pulses, $T_X$, which caused the respective waveforms 30 can be recorded along with the waveforms on a separate synch track monitored by head 824.5.

Timing network 822 is further provided with a counter responsive to pulses $T_X$ to recognize when four waveforms have been recorded and thereafter generate a correlation pulse 828 on line 830 for each disc revolution. Each correlation pulse 828 serves to enable preselected aligned segments of the recorded waveforms to be correlated.

During playback signals from heads 824.1–824.4 are passed through variable delay circuits 832.1–832.4 respectively to analog logic gates 834.1–834.4. Circuits 832 provide delays, δ, as a function of signals applied on control input lines. The analog gates 834 are controlled by the signal on line 830 to enable the delayed waveforms to pass through for the duration of correlation pulses 828.

The correlation pulses are also shown coupled to a counter 836 having present inputs on lines 840 and 842 for input parameters corresponding to the values for ΔTMIN and ΔTMAX as shown and explained with reference to FIGS. 21A–H. A digital to analog converter 844 is shown coupled to the counter 836 to generate delay control signals on lines 846.1–846.4 respectively coupled to control variable delays 832.1–832.4.

The outputs of analog logic gates 834 are shown connected to a correlation function generator 850 whose output on line 852 is applied to plotter 806 and a peak detector 808. The correlation function is obtained for the waveform segments being played back during correlation pulses 828.

With each correlation pulse 828, or revolution of disc 802, the counter 836 is advanced from a low value $V_{min}$ to $V_{max}$ and in a corresponding manner the signal levels on lines 846 are varied. As a result, successively delayed or aligned segments of recorded waveforms are applied through gates 834 to correlation function generator 850.

The amount of the delay signal applied on lines 846 can be determined by selecting the output level of the D/A converter 844. In addition, controls 854 are provided to set the original delay levels at values similar to the initial correlation start locations employed in FIGS. 21A–H.

The width of the waveform segments being correlated is selected with the duration of pulse 828. This may be, for example, of the order of about 30 microseconds. As each pulse 828 advances counter 836, when it reaches its capacity as set by the input 842 for ΔTMAX, an output signal occurs on line 856. Line 856 is applied to timing network 822 to terminate the correlation process.

The count value in counter 836 is the correlation variable employed and made proportional to or related to the velocity of the wave being investigated. A signal is, therefore, derived from the D/A converter 844 on line 858 to provide a velocity input to plotter 806 as correlation values are recorded from function generator 850.

With the apparatus 800 one may, therefore, obtain a indication of an acoustic wave parameter of a sonic wave, such as the transit time of the compressional wave by identifying the peak correlation value with detector 808 and noting its associated value for ΔT.

Having thus described a method and apparatus in accordance with the invention for determining acoustic wave parameters of sonic waves detected during sonic borehole logging, the advantages of the invention can be appreciated. Variations of the specific steps and devices described herein may be adopted while remaining within the scope of the invention as set forth by the following claims.

What is claimed is:

1. A method for automatically measuring an acoustic wave parameter of a sonic wave present in a plurality of waveforms derived from selectively spaced sonic receivers operated in a borehole investigation comprising the steps of producing a set of waveforms representative of sonic waves detected by at least four sonic receivers;

combining by multiplication successively different waveform segments from respective ones of said at least four receivers, wherein said segments are selected according to different values of an acoustic wave parameter of a sonic wave to produce measurements of the correspondence between waveform segments from at least four different sonic receivers as a function of the different acoustic wave parameter values;

automatically comparing said correspondence measurements to determine which represents the best correspondence between said waveform segments;

selecting the acoustic wave parameter value which yields said best correspondence between the waveform segments in the set to determine the acoustic wave parameter for said sonic wave; and recording said selected acoustic wave parameter as a function of borehole depth.

2. An apparatus for automatically determining an acoustic wave parameter of a sonic wave present in a plurality of borehole waveform signals derived from sonic receivers operatively spaced in a predetermined manner in a borehole comprising means for producing a set of at least four borehole waveform signals representative of sonic waves detected by at least four sonic receivers;

means for storing the set of borehole waveform signals;

means for producing parameter signals representative of a range of values of the acoustic wave parameter;

means for selecting different segments of the stored borehole waveform signals in correspondence with the parameter signals to produce segment signals which characterize the sonic wave whose acoustic parameter is to be determined;

means responsive to the segment signals for combining by multiplication successively different segments of the stored borehole waveform signals for respectively different values of the parameter signals to produce measurement signals representative of the correspondence between the waveform segments of said at least four borehole waveform signals as a function of the acoustic wave parameter values;

means for comparing said measurement signals to produce a signal representative of the best correspondence between the waveform segments; and means for selecting the parameter signal associated with the best correspondence measurement signal as the value for the acoustic wave parameter for said at least four waveforms in the set.

3. An apparatus to automatically determine the velocity of a sonic wave present in waveforms representative of sonic waves detected with a plurality of sonic receivers in a borehole investigation comprising means for storing a set of at least four waveform signals individually representative of sonic waves incident upon respective ones of at least four receivers operatively spaced from each other at known distances;

means for selecting successively different segment signals of the waveform signals as a function of a predetermined range of values of the velocity of the sonic wave;

means for combining by multiplication successively different sets of at least four waveform segment signals and produce measurement signals representative of the correspondence therebetween as a function of said predetermined range of velocity values;

means for comparing the measurement signals to determine which is representative of the best correspondence between the at least four waveform segments; and means for determining the velocity value associated with the measurement signal representative of the best correspondence between combined segment signals as the velocity of the sonic wave for the set of at least four waveforms signals.

4. The apparatus to automatically determine the velocity of a sonic wave as claimed in claim 3 wherein the selecting means further includes means for generating successive delay signals representative of the location of the different segments in their respective waveforms as a function of the velocity of the sonic wave;

aligning means responsive to the delay signals to provide successive alignments of the waveform segment signals in correspondence with the delay signals.

5. The apparatus to automatically determine the velocity of a sonic wave as claimed in claim 4 wherein the combining means further includes means responsive to the successively different segment signals for generating multiple fold correlations therebetween indicative of the measurement signals.

6. The apparatus to automatically determine the velocity of a sonic wave as claimed in claim 3 wherein the selecting means further includes means responsive to one of the stored waveform signals for detecting the first motion therein and producing a first motion signal indicative of the location in the waveform of the first motion; and means responsive to the first motion signal for determining the location of the successively different segments in the remaining waveforms with reference to the first motion signal function of the velocity of the sonic wave.

7. The apparatus to automatically determine the velocity of a sonic wave as claimed in claim 6 wherein the means for detecting the first motion further includes means for producing a gauge signal representative to the maximum peak-to-peak value of the one waveform signal;

means responsive to the gauge signal for producing a threshold signal representative of a predetermined portion of the gauge signal; and means for comparing the one waveform signal with the threshold signal to generate said first motion signal when the waveform signal initially exceeds the threshold signal.

8. The method for automatically determining an acoustic wave parameter of a sonic wave as claimed in claim 1 wherein said combining step further includes the steps of aligning the waveforms in the set in accordance with different values for the acoustic wave parameter in a predetermined range thereof;

combining said waveforms when aligned at the respective different acoustic wave parameter values to form measurements of correspondence between said at least four waveforms.

9. The method for automatically determining an acoustic wave parameter of a sonic wave as claimed in claim 8 wherein the waveform aligning step further includes the steps of estimating start locations of the sonic wave in the respective waveforms; and varying the estimated start locations as a function of the acoustic wave parameter values to provide successively different alignments of the waveforms.

10. The method for automatically determining an acoustic wave parameter of a sonic wave as claimed in claim 9 wherein the estimating step further includes the steps of detecting in a first waveform the arrival of the sonic wave at a corresponding receiver and assign the detected arrival as a start location for the corresponding first waveform;

and wherein the varying step includes the step of referencing successive start locations in the remaining waveforms as a function of the acoustic wave parameter values and with respect to the assigned start location for the first waveform.

11. The method for automatically determining an acoustic wave parameter as claimed in claim 8 and further including the steps of modifying the determined value of the acoustic wave parameter in accordance with a predetermined relationship to estimate the locations of a second sonic wave in the waveforms, and with the second sonic wave having a second acoustic wave parameter value;

aligning segments of the waveforms following estimated locations for the second wave in accordance with different values for the second acoustic wave parameter in a predetermined range thereof;

combining the aligned segments of the waveforms for the respective different values of the second acoustic wave parameter to form measurements of the alignments of the waveform segments; and selecting the acoustic wave parameter value which produced the best alignment as a determination of the second acoustic wave parameter.

12. The method for automatically determining an acoustic wave parameter of a sonic wave as claimed in claim 1 wherein said acoustic wave parameter is the velocity of the sonic wave.

13. The method for automatically determining an acoustic wave parameter of a sonic wave as claimed in claim 12 wherein said sonic wave is the formation compressional wave.

14. The method for automatically determining the velocity of a sonic wave as claimed in claim 13 and further including the steps of modifying the determined compressional wave velocity value by a predetermined amount to estimate initial waveform start locations representative of arrival times of a shear formation sonic wave at the receivers;

varying the shear wave start locations as a function of different shear wave velocity values;

combining shear wave segments of at least four of the waveforms following the shear wave start locations for each of the different shear wave velocity values to produce measurements of the correspondence between the shear segments of said at least four waveforms as a function of the velocity of the shear wave; and selecting the shear wave velocity value for which the best correspondence measurement between said at least four waveforms was produced as a determination of the shear wave velocity.

15. A method for automatically measuring an acoustic wave parameter of a sonic wave present in a plurality of waveforms derived from selectively spaced sonic receivers operated in a borehole investigation comprising the steps of producing a set of waveforms representative of sonic waves detected by at least four sonic receivers;

computing for each set of at least four waveforms from respective ones of said at least four receivers multiple fold correlation products as a function of different values for the acoustic wave parameter, selecting the maximum correlation product and its associated acoustic wave parameter value;

forming a weighted average of a preselected number of correlation products surrounding the selected maximum correlation product; and computing the acoustic wave parameter value corresponding to the weighted average correlation product as the selected acoustic wave parameter.

16. The method for automatically determining an acoustic wave parameter as set forth in claim 15 and further including combining a predetermined number of acoustic wave parameter values for which multiple fold correlation products were previously computed to form a smoothed acoustic wave parameter value.

17. A method for automatically determining an acoustic wave parameter of a sonic wave present in a plurality of waveforms derived from selectively spaced sonic receivers operated in a borehole investigation comprising the steps of
producing a set of waveforms representative of sonic waves detected by at least four sonic receivers;
measuring the amplitude of a first waveform in the set and form a waveform gauge value thereof;
selecting a predetermined portion of the waveform gauge value to form a threshold value;
detecting the place where said first waveform exceeds the threshold value as a start location for the sonic wave
estimating for other waveforms in the set the start locations for said sonic wave,
aligning the at least four wave forms in the set initially in accordance with said start locations and subsequently as a function of a predetermined range of acoustic wave parameter values,
combining by multiplication successively different waveform segments from respective ones of said variously aligned at least four receiver waveforms, wherein said segments are selected according to different values of an acoustic wave parameter of a sonic wave, to produce measurements of the correspondence between waveform segments as a function of different acoustic wave parameter values;
selecting the acoustic wave parameter value which yields the best correspondence between the waveform segments to determine the acoustic wave parameter for said sonic wave; and
recording said selected acoustic wave parameter as a function of borehole depth.

18. The method of automatically determining the acoustic wave parameter as claimed in claim 17 wherein the waveforms are in the form of samples and said measuring step further includes the steps of
scanning samples of said first waveform; and
selecting samples representative of the largest peak to peak amplitude of said first waveform as a measurement of the amplitude of said first waveform.

19. The method of automatically determining the acoustic wave parameter as claimed in claim 18 wherein the detecting step further includes the steps of
forming a first sum of a first number of samples of the first waveform;
forming a second sum of a second number of samples located in succession relative to the first number in the first waveform;
forming a discriminator value representative of the difference between the first and second sums;
comparing the discriminator value with the threshold value;
repeating said discriminator forming and comparing steps for successive samples of the first waveform until said discriminator value exceeds the threshold value; and
identifying a sample in the first and second numbers of samples which produced said excess as said start location for the first waveform.

* * * * *